United States Patent
Jennings

(10) Patent No.: US 11,899,608 B2
(45) Date of Patent: Feb. 13, 2024

(54) METHOD AND APPARATUS FOR PROVIDING C-PHY INTERFACE VIA FPGA IO INTERFACE

(71) Applicant: GOWIN Semiconductor Corporation, GuangZhou (CN)

(72) Inventor: Grant Thomas Jennings, Austin, TX (US)

(73) Assignee: GOWIN Semiconductor Corporation Ltd., GuangZhou (CN)

(*) Notice: Subject to any disclaimer, the term of this patent is extended or adjusted under 35 U.S.C. 154(b) by 0 days.

(21) Appl. No.: 17/746,563

(22) Filed: May 17, 2022

(65) Prior Publication Data

US 2022/0365897 A1     Nov. 17, 2022

Related U.S. Application Data

(60) Provisional application No. 63/189,607, filed on May 17, 2021.

(51) Int. Cl.
| | |
|---|---|
| *G06F 13/36* | (2006.01) |
| *G06F 13/40* | (2006.01) |
| *G06F 13/42* | (2006.01) |
| *G06F 13/38* | (2006.01) |

(52) U.S. Cl.
CPC ........ *G06F 13/4068* (2013.01); *G06F 13/385* (2013.01); *G06F 13/4027* (2013.01); *G06F 13/4291* (2013.01)

(58) Field of Classification Search
None
See application file for complete search history.

(56) References Cited

U.S. PATENT DOCUMENTS

| | | | |
|---|---|---|---|
| 9,160,520 B1* | 10/2015 | Hwang | G11C 7/222 |
| 2008/0013645 A1* | 1/2008 | Muto | H04L 25/0274 |
| | | | 375/297 |
| 2016/0203099 A1* | 7/2016 | Kim | G06F 13/4282 |
| | | | 710/105 |
| 2017/0019186 A1* | 1/2017 | Wiley | G06F 13/387 |
| 2019/0235878 A1* | 8/2019 | Lin | G09G 5/006 |

\* cited by examiner

*Primary Examiner* — Henry Tsai
*Assistant Examiner* — Dean Phan
(74) *Attorney, Agent, or Firm* — JW Law Group; James M. Wu

(57) ABSTRACT

A method and/or process of interface bridging device for providing a C physical layer ("C-PHY") input output interface via a field programmable gate arrays ("FPGA") is disclosed. The process, in one aspect, is capable of coupling a first wire of data lane 0 to a first terminal of first IO serializer of FPGA for receiving first data from a D-PHY transmitter of a first device and coupling a second wire of the data lane 0 to a second terminal of the first IO serializer of FPGA for receiving second data from the D-PHY transmitter. Upon activating a first scalable low-voltage signal to generate a first value on P channel and a second value on N channel in response to the first data and the second data, a first signal on first wire of trio 0 for a C-PHY output is generated based on the first value on the P channel.

23 Claims, 18 Drawing Sheets

METHOD AND APPARATUS FOR PROVIDING C-PHY INTERFACE VIA FPGA IO INTERFACE

PRIORITY

This application claims the benefit of priority based upon U.S. Provisional Patent Application Ser. No. 63/189,607, filed on May 17, 2021 in the name of the same inventor(s) and entitled "Method and System for Providing MIPI D-PHY to MIPI C-PHY Interface Bridging Solution," the disclosure of which is hereby incorporated into the present application by reference.

RELATED APPLICATION

This application is related to the following co-pending application assigned to the Assignee of the present invention.

a. application Ser. No. 17/746,520, filed May 17, 2022, entitled "Method and Apparatus for Providing A Bridging Device for Interfacing between D-PHY and C-PHY," invented by the same inventors and assigned to the same assignee.

FIELD

The exemplary embodiment(s) of the present invention relates to the field of information communication. More specifically, the exemplary embodiment(s) of the present invention relates to data conversion between different bus protocols.

BACKGROUND

With increasing popularity of digital communication, artificial intelligence (AI), IoT (Internet of Things), and/or robotic controls, the demand for faster and efficient hardware and semiconductors with processing capabilities is constantly in demand. To meet such demand, high-speed and flexible semiconductor chips are generally more desirable. One conventional approach to satisfy such demand is to use dedicated custom integrated circuits and/or application-specific integrated circuits ("ASICs") to fulfil such needs. An alternative approach, which enjoys growing popularity, is utilizing programmable semiconductor devices ("PSD") such as programmable logic devices ("PLDs") or field programmable gate arrays ("FPGAs"). For instance, an end user can program a PSD to perform desirable functions.

To process multimedia information such as video and image data, converting data stream from one data protocol to another data protocol is necessary partially due to new technologies as well as different device manufacturers. For example, new technology such C physical layer ("C-PHY") data stream is more efficient than D physical layer ("D-PHY") data steam. Since many devices or system have been using D-PHY protocol, a conversion between D-PHY and C-PHY data streams can be helpful in certain circumstances.

SUMMARY

One embodiment of the present invention discloses an interface bridging device ("IBD") capable of facilitating data conversion between data streams of D physical layer ("D-PHY") and data streams of C physical layer ("C-PHY"). IBD includes a first integrated circuit ("IC") component, a bridge component, and a second IC component. The first IC component is able to process digital information and is configured to generate a first data stream formatted in D-PHY data stream. The bridge component receives the first data via a D-PHY bus and subsequently converts the first data steam to a second data steam formatted in a C-PHY data stream. The second IC component is configured to obtain the second data stream via a C-PHY bus.

Alternatively, a method and/or process of IBD for providing a C-PHY ("input output "IO") interface via a field programmable gate arrays ("FPGA") is disclosed. The process, in one aspect, is capable of coupling a first wire of data lane 0 to a first terminal of first IO serializer of FPGA for receiving first data from a D-PHY transmitter of a first device and coupling a second wire of the data lane 0 to a second terminal of the first IO serializer of FPGA for receiving second data from the D-PHY transmitter. Upon activating a first scalable low-voltage signal ("SLVS") to generate a first value on P channel and a second value on N channel in response to the first data and the second data, a first signal on first wire of trio 0 for a C-PHY output is generated based on the first value on the P channel.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
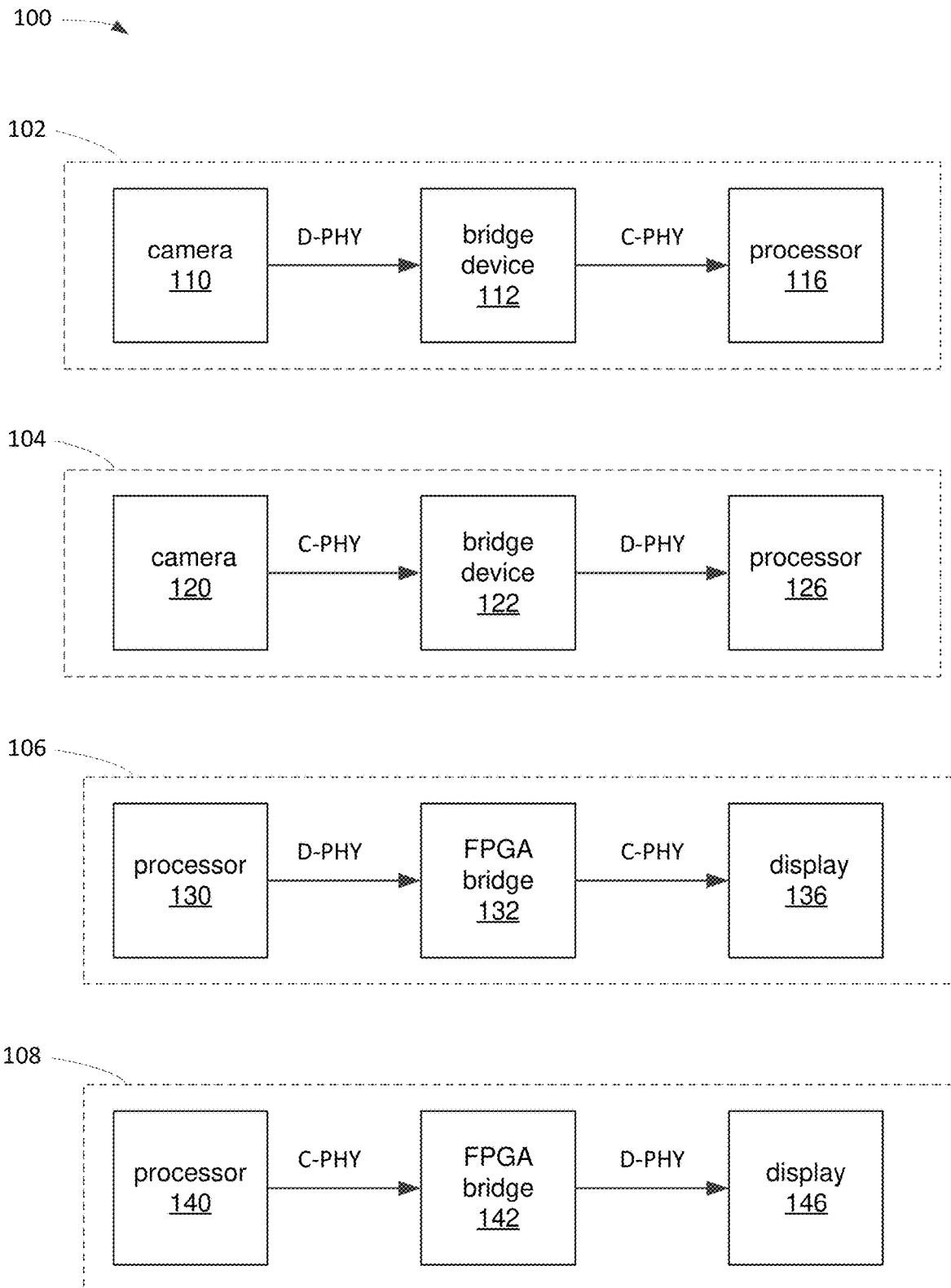
FIG. 1 is a block diagram illustrating exemplary interface bridging devices ("IBDs") capable of bridging or converting between D-PHY and C-PHY data streams in accordance with one embodiment of the present invention.

Embodiments of the present invention disclose a method(s) and/or apparatus for providing a bridging device capable of converting data streams between D-PHY data and C-PHY data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses an interface bridging device ("IBD") capable of facilitating data conversion between data streams of D physical layer ("D-PHY") and data streams of C physical layer ("C-PHY"). IBD includes a first integrated circuit ("IC") component, a bridge component, and a second IC component. The first IC component is able to process digital information and is configured to generate a first data stream formatted in D-PHY data stream. The bridge component receives the first data via a D-PHY bus and subsequently converts the first data steam to a second data steam formatted in a C-PHY data stream. The second IC component is configured to obtain the second data stream via a C-PHY bus.

Alternatively, a method and/or process of IBD for providing a C-PHY ("input output "IO") interface via a field programmable gate arrays ("FPGA") is disclosed. The process, in one aspect, is capable of coupling a first wire of data lane 0 to a first terminal of first IO serializer of FPGA for receiving first data from a D-PHY transmitter of a first device and coupling a second wire of the data lane 0 to a second terminal of the first IO serializer of FPGA for receiving second data from the D-PHY transmitter. Upon activating a first scalable low-voltage signal ("SLVS") to generate a first value on P channel and a second value on N channel in response to the first data and the second data, a first signal on first wire of trio 0 for a C-PHY output is generated based on the first value on the P channel.

Overview

MIPI® D-PHY is a hardware physical interface for connectivity between semiconductor devices (or chips) in mobile devices. It is used in conjunction with MIPI CSI-2 (Camera Serial Interface 2) and DSI (Display Serial Interface) link layers to provide interfacing to cameras and displays primarily in mobile devices. Similarly, MIPI® C-PHY hardware physical interface used for the same purpose as MIPI D-PHY, but with higher throughput per IO over the same line rate and with lower power consumption. C-PHY employs two IOs, wires, and driver states per channel of transmission compared to D-PHY, which uses LVDS (Low Voltage Differential Source) signaling having two IOs, wires, and driver states. MIPI C-PHY can use similar MIPI CSI-2 and DSI-2 link layers and is primarily used for interfacing to cameras and displays like MIPI D-PHY. Normally, one D-PHY physical interface will have 1 to 4 differential data lanes and 1 differential clock lane while one C-PHY physical interface will have 1 to 3 "trios" (3-wire lanes). Each trio of C-PHY equates to a comparable 2.28× bandwidth compared to a D-PHY data lane. In other words, C-PHY encodes data packing 16/7≈2.28 bits/symbol wherein D-PHY does not require encoding. As such, C-PHY can provide a higher data rate as compared to D-PHY.

FIG. 1 is a block diagram 100 illustrating exemplary interface bridging devices ("IBDs") capable of bridging or converting between D-PHY and C-PHY data streams in accordance with one embodiment of the present invention. Diagram 100 shows four (4) different layouts of IBDs 102-108. It should be noted that the underlying concept of the exemplary embodiment(s) of the present invention would not change if one or more blocks (circuit or elements) were added to or removed from FIG. 1.

Layout 102 includes a camera 110, bridge device 112, and processor 118. In one aspect, camera 110 is connected to bridge device 112 via a D-PHY bus and bridge device 112 is connected to processor 116 via a C-PHY bus. While camera 110 can be a processor or image sensor, processor 116 can also be a display. A function of bridge device 112 is to bridge or convert data streams between D-PHY and C-PHY. Layout 102 essentially shows a connection of a D-PHY camera (image sensor) to a C-PHY processor.

Layout 104 includes a camera 120, bridge device 122, and processor 128. In one aspect, camera 120 is connected to bridge device 122 via a C-PHY bus and bridge device 122 is connected to processor 126 via a D-PHY bus. A function of bridge device 122 is to bridge or convert data streams between D-PHY and C-PHY data format. Layout 104 illustrates a connection of a C-PHY camera (image sensor) to a D-PHY processor.

Layout 106 includes a processor 130, bridge device 132, and display 138. In one aspect, processor 130 is connected to bridge device 132 via a D-PHY bus and bridge device 132 is connected to display 136 via a C-PHY bus. A function of bridge device 122 is to bridge or convert data streams for transmission between D-PHY and C-PHY standards. Layout 106 illustrates a connection of a D-PHY processor to a C-PHY display.

Layout 108 includes a processor 140, bridge device 142, and display 148. In one aspect, processor 140 is connected to bridge device 142 via a C-PHY bus and bridge device 142 is connected to display 146 via a D-PHY bus. A function of bridge device 132 is to bridge or convert data streams for transmission between D-PHY and C-PHY. Layout 108 illustrates a connection of a C-PHY processor to a D-PHY display.

A benefit of using IBD or bridge device is to facilitate communication between processors, displays, and/or cameras having different IO protocols whereby enhancing overall communication efficiency.

Figure 2:
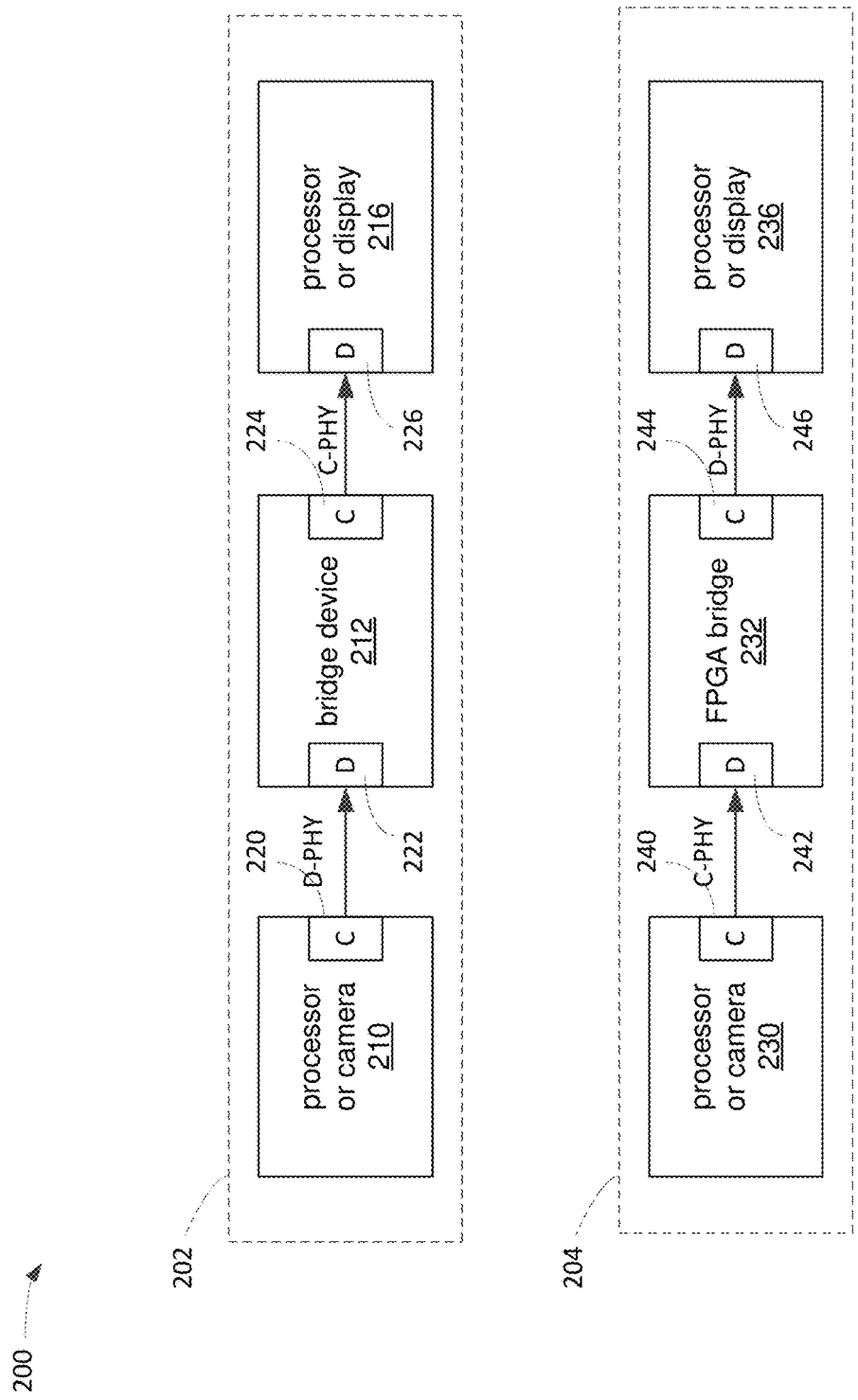
FIG. 2 is a block diagram illustrating alternative IBD layouts 202-204 employing data compressing scheme for bridging D-PHY data stream and C-PHY data stream in accordance with one embodiment of the present invention.

FIG. 2 is a block diagram 200 illustrating alternative IBD layouts 202-204 employing data compressing scheme for bridging D-PHY data stream and C-PHY data stream in accordance with one embodiment of the present invention. IBD layout 202 includes a processor or camera 210, bridge device 212, and display or processor 218. In one aspect, camera 210 is connected to bridge device 212 via a D-PHY bus and bridge device 212 is connected to display 216 via a C-PHY bus. A function of bridge device 212 is to bridge or convert data streams for transmission between D-PHY and C-PHY. In one embodiment, a compression method is used for enhancing efficiency of data transmission. For example, camera 210 includes a compressor 220 which compresses outgoing D-PHY data steam before transmission. Upon receipt of compressed data over the D-PHY bus, bridge device 212 activates its decompressor 222 to decode the compressed data received from the D-PHY bus. Bridge device 212 also includes a compressor 224 which compresses outgoing C-PHY data steam before transmission. Upon receipt of compressed data over the C-PHY bus, display 216 activates its decompressor 226 to decode the compressed data received from the C-PHY bus.

IBD layout 204 includes a processor or camera 230, bridge device 232, and display or processor 238. In one aspect, camera 230 is connected to bridge device 232 via a C-PHY bus and bridge device 232 is connected to display 236 via a D-PHY bus. A function of bridge device 232 is to bridge or convert data streams for transmission between D-PHY and C-PHY. In one embodiment, a compression method is used for enhancing efficiency of data transmission. For example, camera 230 includes a compressor 240 which compresses outgoing C-PHY data steam before transmission. Upon receipt of compressed data over the C-PHY bus, bridge device 232 activates its decompressor 242 to decode the compressed data received from the C-PHY bus. Bridge device 232 also includes a compressor 244 which compresses outgoing D-PHY data steam before transmission. Upon receipt of compressed data over the D-PHY bus, display 236 activates its decompressor 246 to decode the compressed data received from the D-PHY bus.

A benefit is to reduce bus congestion during transmission for facilitating real-time image or video data processing.

Interface Bridge Device Architecture

Figure 3A:
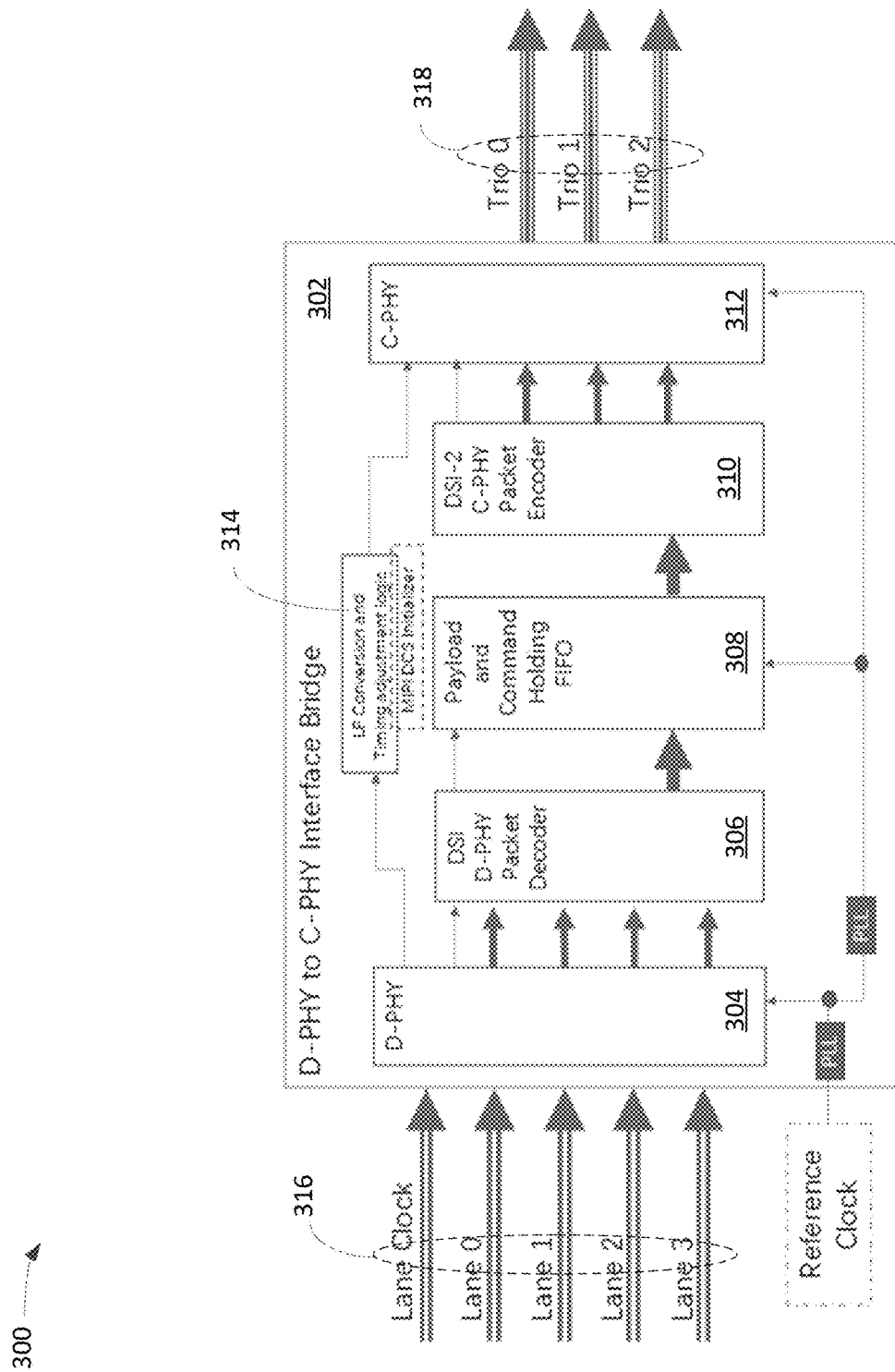
FIGS. 3A-3D are block diagrams illustrating embodiments of IBDs in accordance with one embodiment of the present invention.

FIG. 3A is a block diagram 300 illustrating an embodiment of IBD showing D-PHY to C-PHY bridge architecture in accordance with one embodiment of the present invention. Diagram 300 includes D-PHY inputs 316, IBD 302, and C-PHY outputs 318 wherein D-PHY inputs 316 contain lanes 0-3 and lane clock with total of 10 wires. C-PHY outputs 318 include three (3) trios 0-2 with total of 9 wires. IBD 302, in one embodiment, includes a D-PHY interface 304, DSI packet decoder 306, FIFO 308, DSI packet encoder 310, and C-PHY interface 312. It should be noted that the underlying concept of the exemplary embodiment(s) of the present invention would not change if one or more blocks (circuit or elements) were added to or removed from FIG. 3A.

A MIPI D-PHY to C-PHY IBD 302, in one aspect, is created by instantiating a D-PHY capable of receiving D-PHY high speed data. D-PHY input 316, in one example, contains 1, 2, 3 or 4 data lanes and 1 clock lane per PHY, but can use multiple D-PHYs. The D-PHY natively deserializes data from 1-bit double data rate to 8-bit single data rate per data lane; however larger deserialization ratios could also be used such at 1-bit to 16-bit.

A cross clock domain FIFO 308 is used to transfer the incoming D-PHY data to a continuous clock if not provided by the D-PHY itself. FIFO 308 is also used to adjust the data bus size from 8-bits×(time) number of data lanes to 16-bits× number of C-PHY "trios". For example, if the D-PHY interface is providing 4-data lanes and the C-PHY interface is providing 3-trios, then the cross-clock domain FIFO would convert 32-bit data to 48-bit data which facilitates C-PHY to designate a 16-bit interface per trio. It should be noted that additional logic or programming around FIFO 308 will be needed to create such a data conversion in light of various semiconductor device capabilities. In operation, data of DSI packets may be adjusted from video payload and video stream commands and to repacketize based on the DSI-2 standard.

After highspeed data conversion, IBD 302 is able to interface with C-PHY which is encoded and serialized over 1, 2 or 3 trios per PHY. In one example, IBD 302 is also able to handle multiple C-PHYs. It should be noted that D-PHY and C-PHY have a LP (Low Power) signaling mode as indicated by numeral 314, which is used to communicate configuration and control data over the same highspeed lines rather without using additional pins. The LP data needs to be transferred from D-PHY to C-PHY, adjusted from two LP wires per data lane to 3 LP wires per data lane, and have its timing adjusted to meet any delay from the D-PHY to C-PHY high speed data conversion pipeline.

In one embodiment, an IBD layout capable of facilitating information transmission between D-PHY and C-PHY includes a first integrated circuit ("IC") component, a bridge component, and a second IC component. The first IC component which can be a camera(s) or processor(s) is able to process digital information and configured to generate a first data stream formatted in D-PHY data stream. The bridge component or IBD 302 is able to receive the first data via a D-PHY bus and convert the first data steam to a second data steam formatted in C_PHY data stream. The second IC component which can be a display(s) or processor(s) is configured to obtain the second data stream via a C-PHY bus. The camera processor, in one example, is capable of processing captured imaging data and formatting processed imaging data into D-PHY data stream. The display processor is capable of displaying images in accordance with the second data stream.

IBD 302, in one embodiment, includes D-PHY interface 302 which is used to interface with the D-PHY bus to receive the first data 316 from a camera. First-in first-out ("FIFO") buffer 308 is used to buffer the data stream. C-PHY circuit or C-PHY interface 312 is able to fetch the data stream from FIFO buffer 308 and convert the first data stream to the second data stream based on C-PHY protocol. Alternatively, C-PHY interface 312 is capable of generating and outputting the second data stream to a display processor via the C-PHY bus. For example, C-PHY circuit or interface 312 generates the second data stream represented by three (3) sets of three wires (trio) 318 to the display process via the C-PHY bus. Low-power ("LP") converter 314 is configured to adjust power requirements between D-PHY interface 304 and C-PHY interface 312. It should be noted that the first IC component such as camera, the second IC component such as display, and the bridge component such as IBD 302 can be fabricated on a single semiconductor die or chip.

Figure 3B:
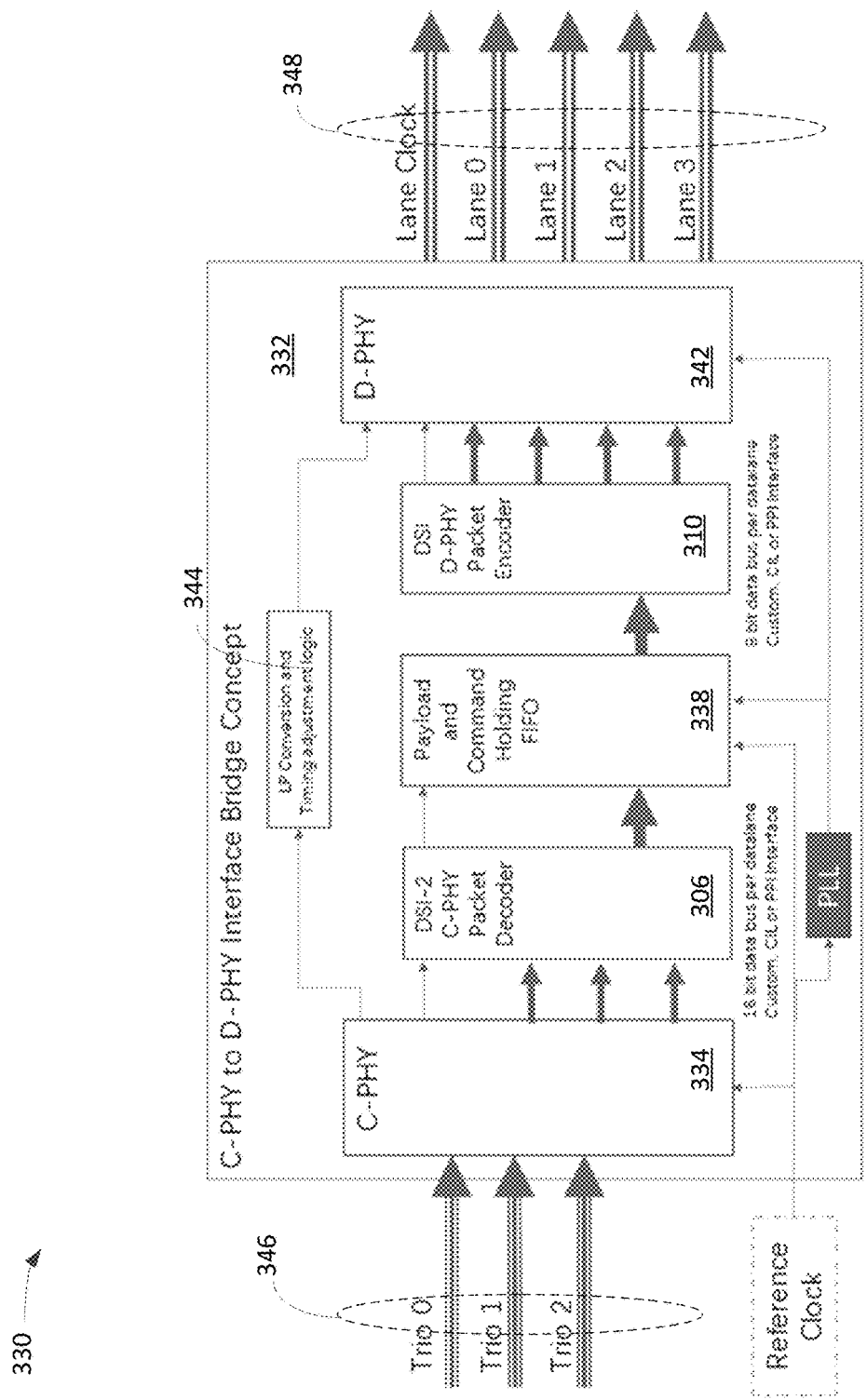

FIG. 3B is a block diagram 330 illustrating an embodiment of IBD showing C-PHY to D-PHY bridge architecture in accordance with one embodiment of the present invention. Diagram 330 includes C-PHY inputs 346, IBD 332, and D-PHY outputs 348 wherein C-PHY inputs 346 contain three (3) trios 0-2 with total of 9 wires. D-PHY outputs 348 include lanes 0-3 and lane clock with total of 10 wires. IBD 332, in one embodiment, includes a C-PHY interface 334, DSI packet decoder 306, FIFO 338, DSI packet encoder 310, and D-PHY interface 342. It should be noted that the underlying concept of the exemplary embodiment(s) of the present invention would not change if one or more blocks (circuit or elements) were added to or removed from FIG. 3B.

It should be noted that C-PHY to D-PHY is similar to D-PHY to C-PHY, but in an opposite direction. MIPI C-PHY data is received on 1, 2, 3 trios per PHY. The C-PHY interface 334, for example, passes the received data onto a FIFO 338 for converting clock domains and subsequently move the data on to a continuous clock domain. The data bus size, in one example, can be converted inside FIFO 338 or with logic gates to adjust from 16-bits per C-PHY trio to 8 bits per D-PHY lane. The data will also strip the DSI-2 packetization from the video payload as indicated by numeral 306 and repacketize based on the DSI standard as indicated by numeral 310. The data is serialized out of D-PHY, for example, at 8-bit single data rate to 1-bit double data rate per D-PHY specification.

In one embodiment, an IBD layout capable of facilitating information transmission between D-PHY and C-PHY includes a first integrated circuit ("IC") component, a bridge component, and a second IC component. The first IC component which can be a camera(s) or processor(s), not shown in FIG. 3B, is able to process digital information and configured to generate a first data stream formatted in C-PHY data stream. The bridge component or IBD 302 is able to receive the first data via a C-PHY bus and convert the first data steam to a second data steam formatted in D_PHY data stream. The second IC component which can be a display(s) or processor(s), not shown in FIG. 3B, is configured to obtain the second data stream via a D-PHY bus.

Figure 3C:
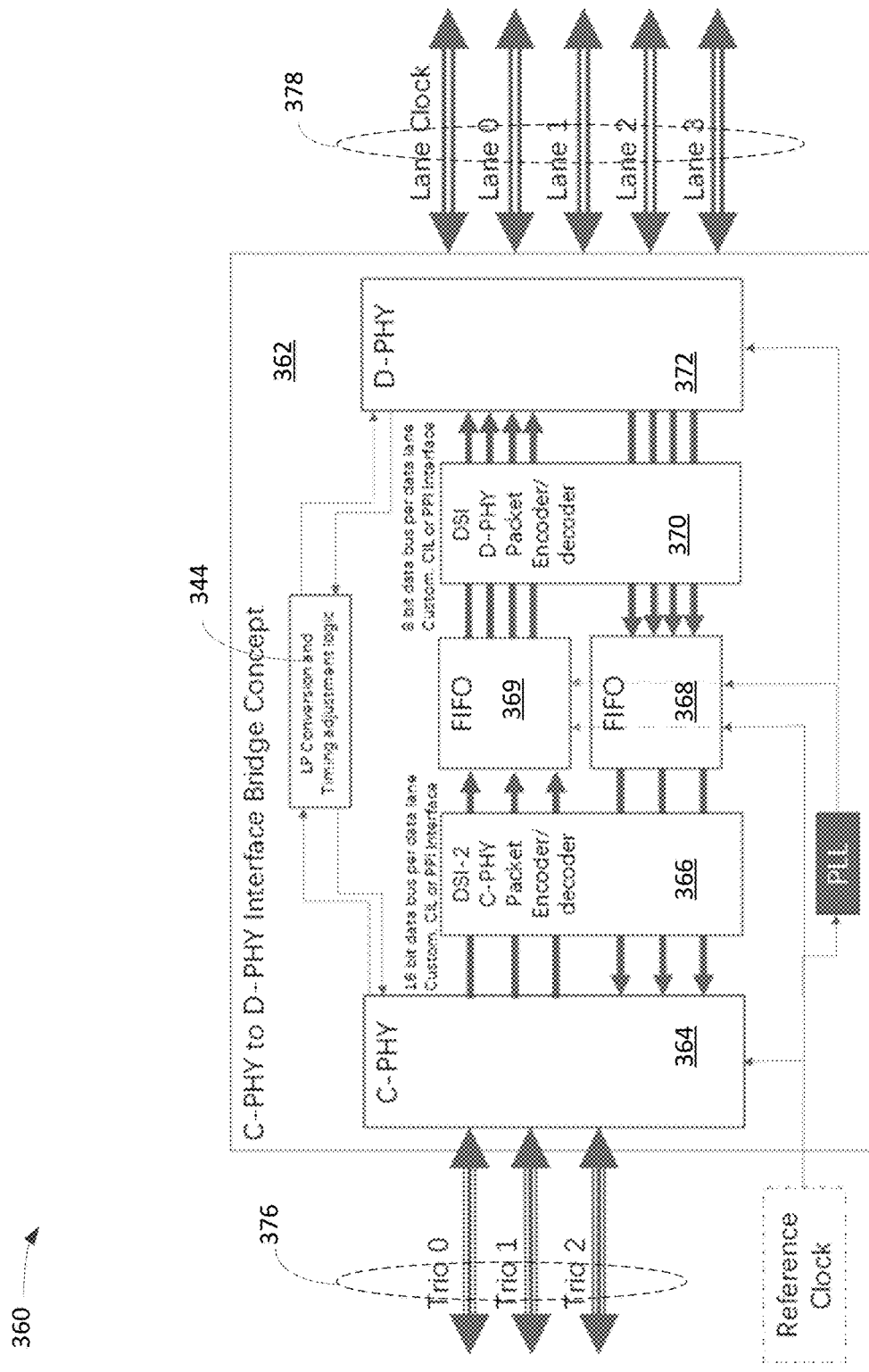

FIG. 3C is a block diagram 360 illustrating one embodiment of IBD showing C-PHY to D-PHY bidirectional bridge architecture in accordance with one embodiment of the present invention. Diagram 360 includes C-PHY bidirectional inputs and outputs (IOs) 376, directional IBD 362, and D-PHY bidirectional IOs 378 wherein C-PHY IOs 376 contain three (3) trios 0-2 with a total of 9 wires. D-PHY IOs 378 include lanes 0-3 and lane clock with a total of 10 wires. IBD 362, in one embodiment, includes a C-PHY interface 364, DSI packet decoder 366, FIFOs 368-369, DSI packet encoder 370, and D-PHY interface 372. It should be noted that the underlying concept of the exemplary embodiment(s) of the present invention would not change if one or more blocks (circuit or elements) were added to or removed from FIG. 3B.

In one embodiment, IBD 362 contains C-PHY to D-PHY RX/TX (receiver/transmitter) bridge combining capabilities of both D-PHY to C-PHY and C-PHY to D-PHY bridges or conversions into one device. IBD 362, for example, is capable of both directions using PHYs with both RX and TX bidirectional capabilities. IBD 362, in one aspect, can cover all cases describe (D-PHY to C-PHY and C-PHY to D-PHY) and is capable of both high speed and low power transmissions in both directions. A benefit of using IBD 362 is to be more flexible as well as conserving chip area.

Figure 3D:
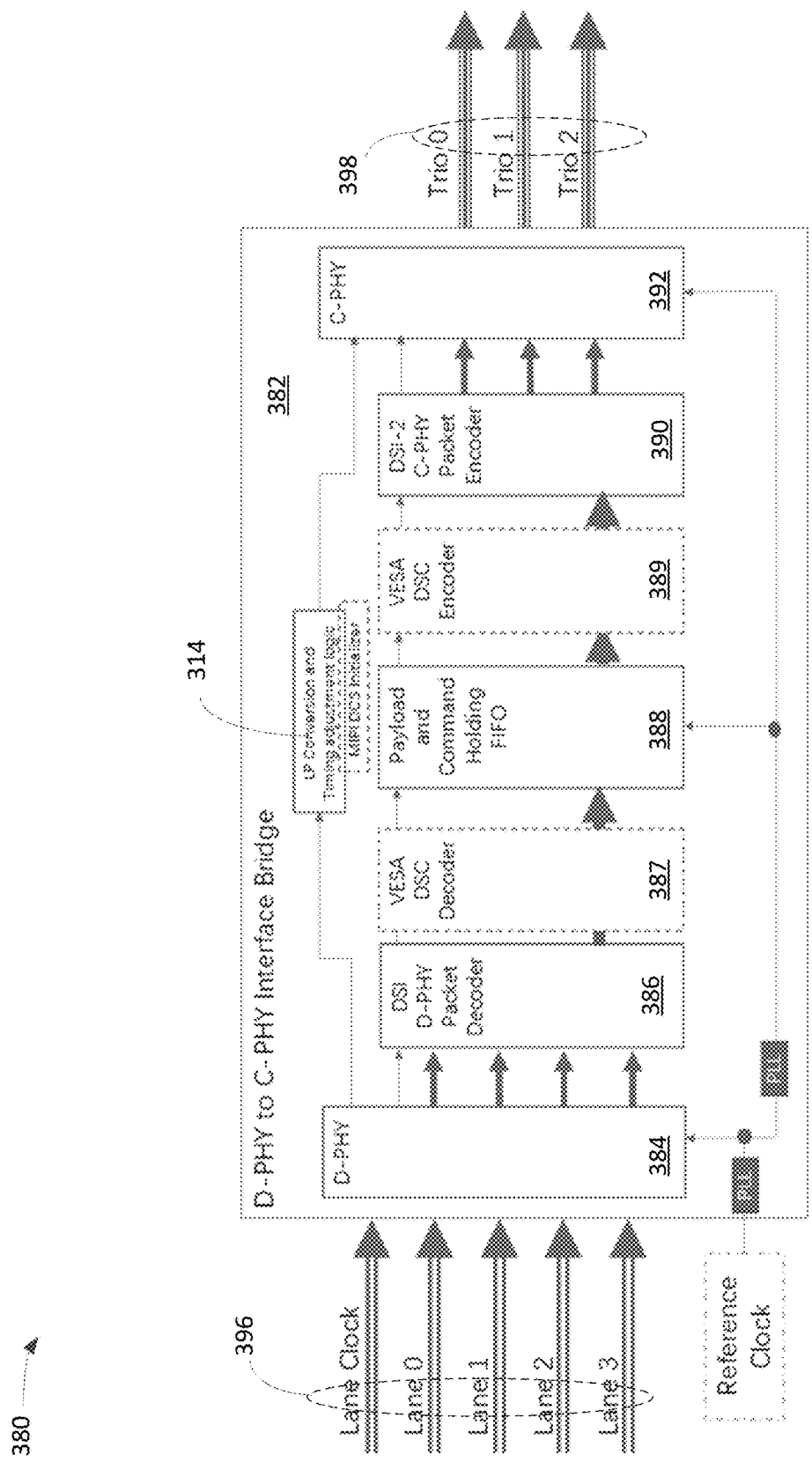

FIG. 3D is a block diagram 380 illustrating one embodiment of IBD showing D-PHY to C-PHY with VESA DSC bridge architecture in accordance with one embodiment of the present invention. Diagram 380 includes D-PHY inputs (IOs) 396, IBD 382, and D-PHY IOs 398 wherein C-PHY IOs 396 contain three (3) trios 0-2 with a total of 9 wires. D-PHY IOs 398 include lanes 0-3 and lane clock with a total of 10 wires. IBD 382, in one embodiment, includes a D-PHY interface 384, DSI packet decoder 386, Video Electronics Standards Association ("VESA") Display Stream Compression ("DSC") decoder 387, FIFO 308, DSI packet encoder 310, VESA DSC encoder 389, and C-PHY interface 392. It should be noted that the underlying concept of the exemplary embodiment(s) of the present invention would not change if one or more blocks (circuit or elements) were added to or removed from FIG. 3D.

A benefit of C-PHY is to achieve higher bandwidth per IO than D-PHY by encoding over more wires. Another way additional bandwidth over the same number of IO and line rates is by adding compression. In one embodiment, VESA DSC is used to compress video streams in real time to achieve 1:2 or 1:3 bandwidth reduction. VESA DSC can be used along with D-PHY and C-PHY interfaces to achieve additional bandwidth gains. It should be noted that D-PHY to C-PHY bridge or IBD can employ any D-PHY data type including DSC and convert data to appropriate or predefined C-PHY data type and/or packet. A D-PHY or C-PHY video interface bridge, in one aspect, can also include a VESA DSC encoder 389 and/or decoder 387 in order to compress or decompress data between an SoC (or processor) and display.

FPGA Serializers to Emulate C-PHY Interface

A bridge or IBD, in one embodiment, employs an FPGA to emulate a C-PHY transmitter interface with common and existing FPGA serializers and IOs. FPGAs have very flexible IO and serializers which are capable of providing more interfaces that what FPGA were design for. As a result, a C-PHY TX PHY could be implemented in a number of ways. A variety of methods need to be explained since different FPGAs have different features.

Figure 4A:
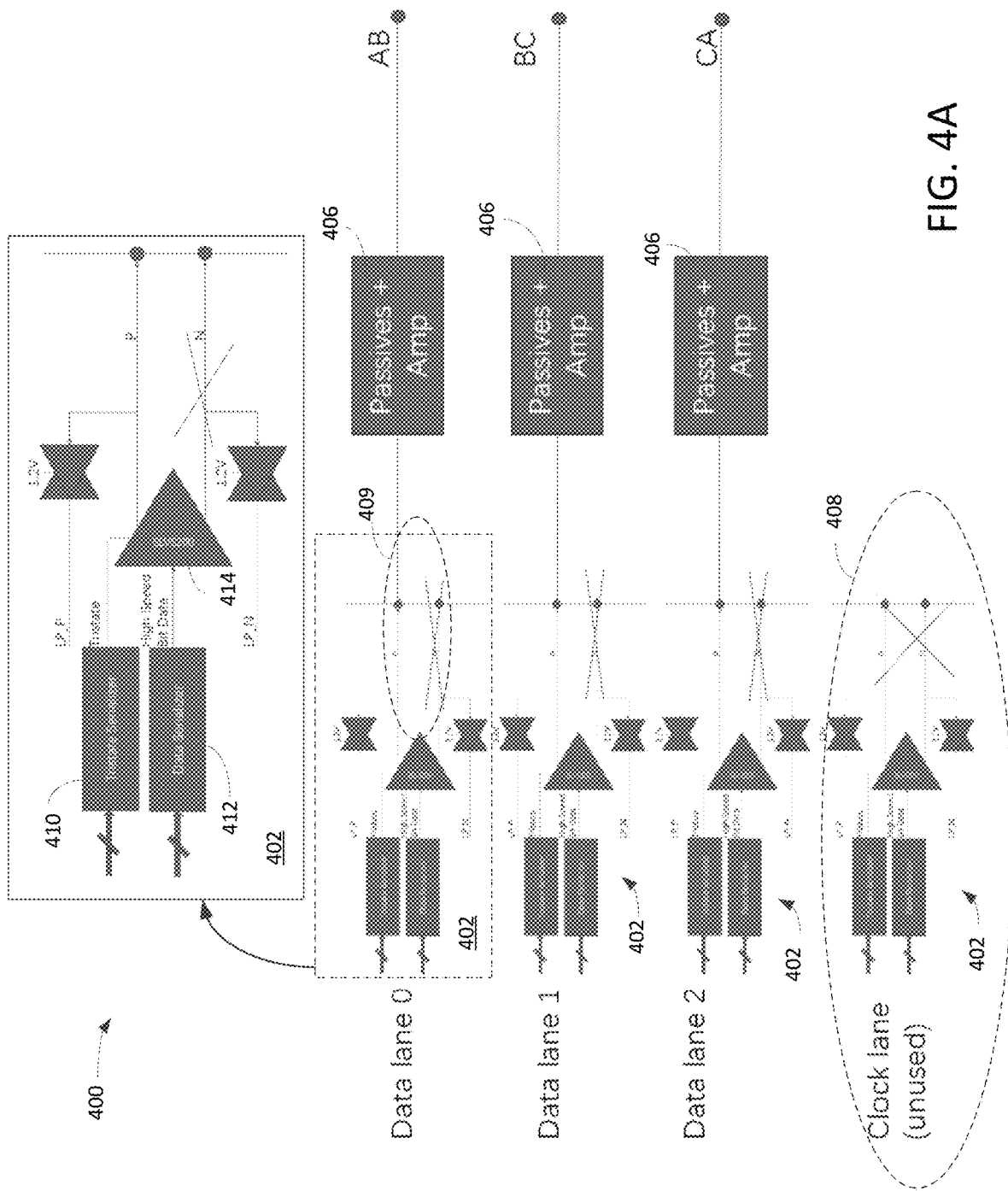
FIGS. 4A-4C are block diagrams illustrating embodiments of IBD using FPGA device(s) in accordance with one embodiment of the present invention.

FIG. 4A is a block diagram 400 illustrating one embodiment of IBD using FPGA block(s) for D-PHY to C-PHY bridging or conversion in accordance with one embodiment of the present invention. Diagram 400 illustrates four (4) serializer blocks 402 and three (3) passive amplifiers ("AMP") 406 to using D-PHY (FPGA) serializer and IO system for emulating one C-PHY trio. Serializer block 402, in one embodiment, is a hardware block in FPGA.

Alternatively, serializer block 402 is a software block in FPGA. In yet another embodiment, serializer block 402 is a combination of hardware and software block. It should be noted that the underlying concept of the exemplary embodiment(s) of the present invention would not change if one or more blocks (circuit or elements) were added to or removed from FIG. 4A.

One embodiment of IBD is implemented using FPGA serializers with D-PHY (SLVS-200 and 1.2V CMOS) to emulate a C-PHY interface. It should be noted that FPGAs contain serializers with addition of higher serialization ratios which enables to provide direction D-PHY IO on the output. D-PHY, in one example, includes SLVS-200 such as block 402 with 1.2V (volts) CMOS IO. SLVS-200 such as block 402 is a high speed differential interface similar to LVDS, but with 200 mV common mode and differential voltages. The CMOS IO is multiplexed with this SLVS-200 IO to enable physical layer operation to perform low speed, low power CMOS control and configuration or switch to high speed data transmission for video payloads.

Serializer block 402, in one aspect, includes a tristate serializer 410, data serializer 412, and SLVS200 414. In one aspect, SLVS 414 is capable of producing values on P channel and N channel based on inputs from tristate serializer 410 and data serializer 412. In one embodiment, tristate serializer 410 is used to receive data from first wire of data lane 0 of D-PHY and data serializer 412 is used to receive data from second wire of data lane 0 of D-PHY. The output of tristate serializer 410 is in response to the data from the first wire of data lane 0 and the output of data serializer 412 is in accordance with the data received from the second wire of data lane 0 of D-PHY. To convert or bridge from D-PHY to C-PHY, the value on P channel is used while the value on N channel is discarded. Alternatively, the value on P channel is discarded while the value on N channel is used. Upon receipt of values from P channels, the output of AMP is used for C-PHY trios.

It should be noted that MIPI D-PHY uses 8:1 serialization ratio. C-PHY uses a 7:1 serializer per wire after the 16:21 bit encoder logic. Note that some FPGA interfaces are flexible enough to switch the 8:1 serialization ratio to 7:1. Alternatively, A 7 bit to 8 bit cross clock domain FIFO and some additional logic can be used to adjust these serialization ratios. C-PHY uses a 250 mV differential signaling with 250 mV common mode voltages, however, D-PHY uses 200 mV differential signaling and 200 mV common mode voltages. Using 200 mV signaling for C-PHY is acceptable since if falls at or above the minimal differential and common voltages. Additionally, many FPGAs have adjustable drive voltage levels that may allow adjustment of the differential and common mode voltage to be closer to the C-PHY nominal range of 250 mV.

C-PHY uses three wire pair signaling instead of a traditional 2-wire differential pair and does not require a clock lane. To use D-PHY for C-PHY, the clock lane is left unused as shown by numeral 408 and the P channel of the differential pair used as shown by numeral 409 to transmit data. The transmitter either needs to be capable of driving the P channel to high impedance per bit cycle An advantage of using FPGA serializer block is to provide additional flexibility since FPGA is a programmable device.

Figure 4B:
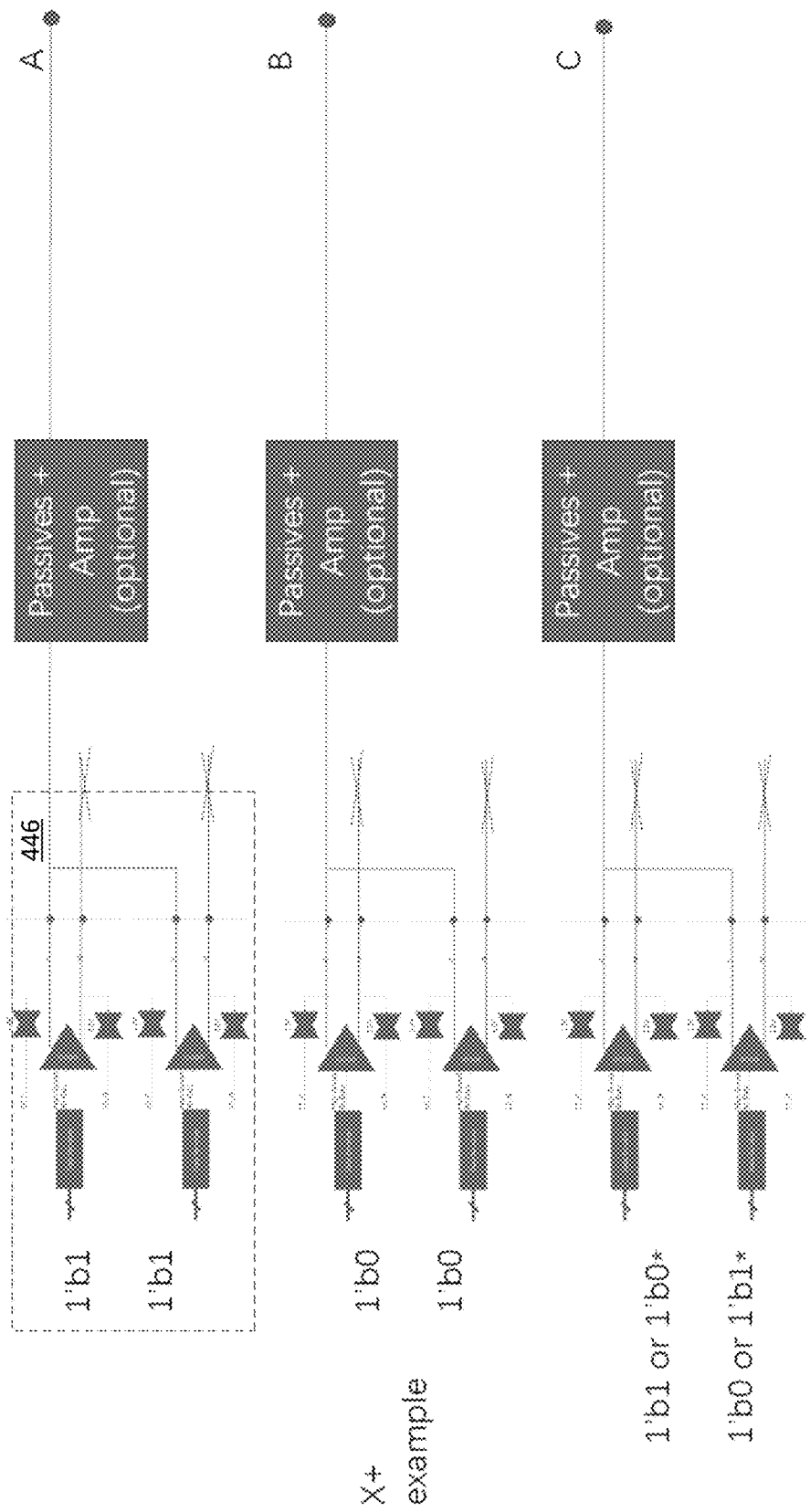

FIG. 4B is a block diagram 440 illustrating one embodiment of IBD using FPGA device(s) in accordance with one embodiment of the present invention. Diagram 440 illustrates a method of using D-PHY serializer and IO system of FPGA for one C-PHY trio. In one embodiment, two (2) serializer blocks are used to implement one C-PHY trio as indicated by numeral 446. It should be noted that the underlying concept of the exemplary embodiment(s) of the present invention would not change if one or more blocks (circuit or elements) were added to or removed from FIG. 4B.

If a transmitter cannot drive the P channel to high impedance per bit cycle, one embodiment is to use two drivers as indicated by numeral 446. For example, a C-PHY trio can drive all three voltages without high impedance by driving both drivers high ('high voltage'), both drivers low ('low voltage'), or one driver high and the other driver low ('middle voltage'). If the driver needs to have its voltage levels modified an external passives (resistors and capacitors) circuit and/or amplifier (MOSFET or opAmp) can be used.

Figure 4C:
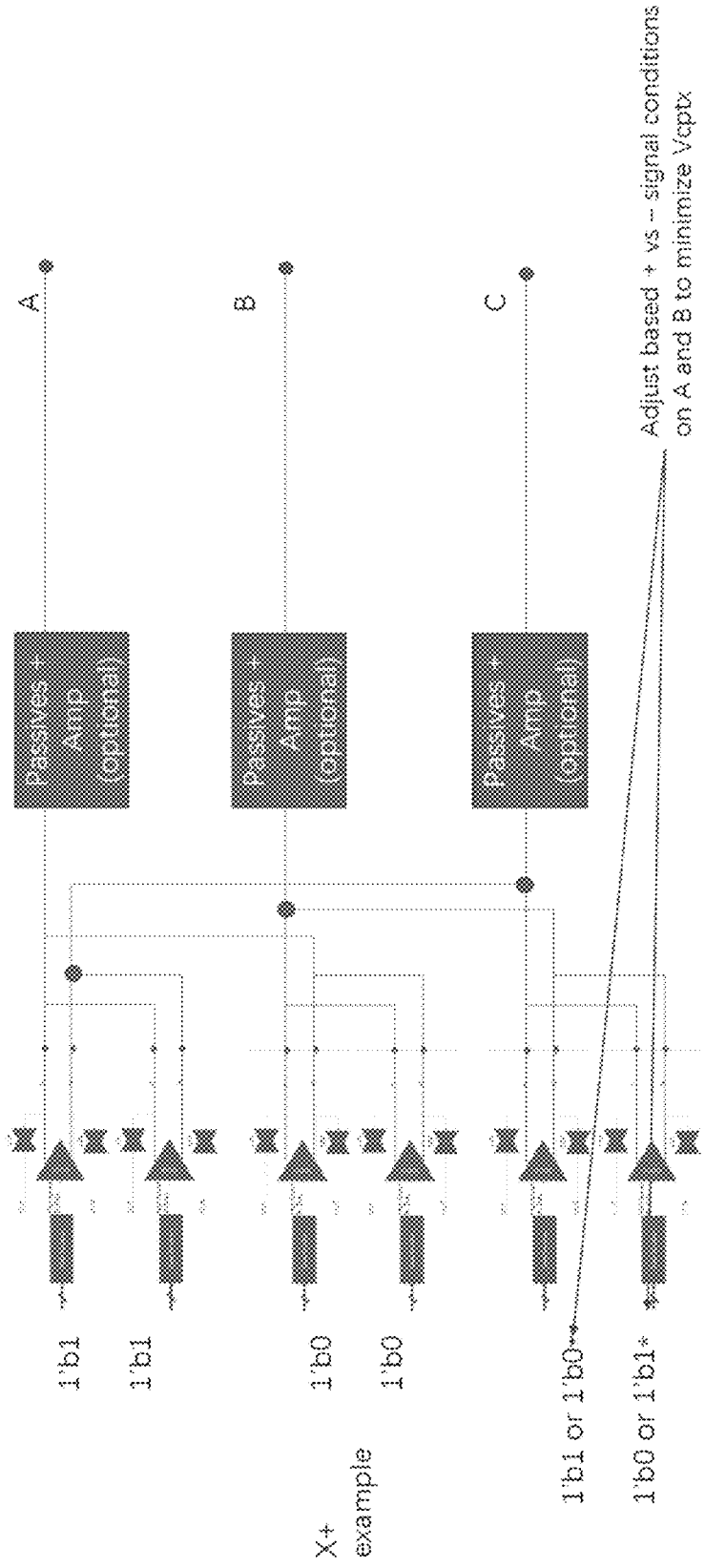

FIG. 4C is a block diagram 470 illustrating an alternative embodiment of IBD using FPGA device(s) in accordance with one embodiment of the present invention. Diagram 470 illustrates a method of using D-PHY serializer and IO system for one C-PHY trio. A benefit of using IBD illustrated in diagram 470 is that AMP is optional.

Figure 5A:
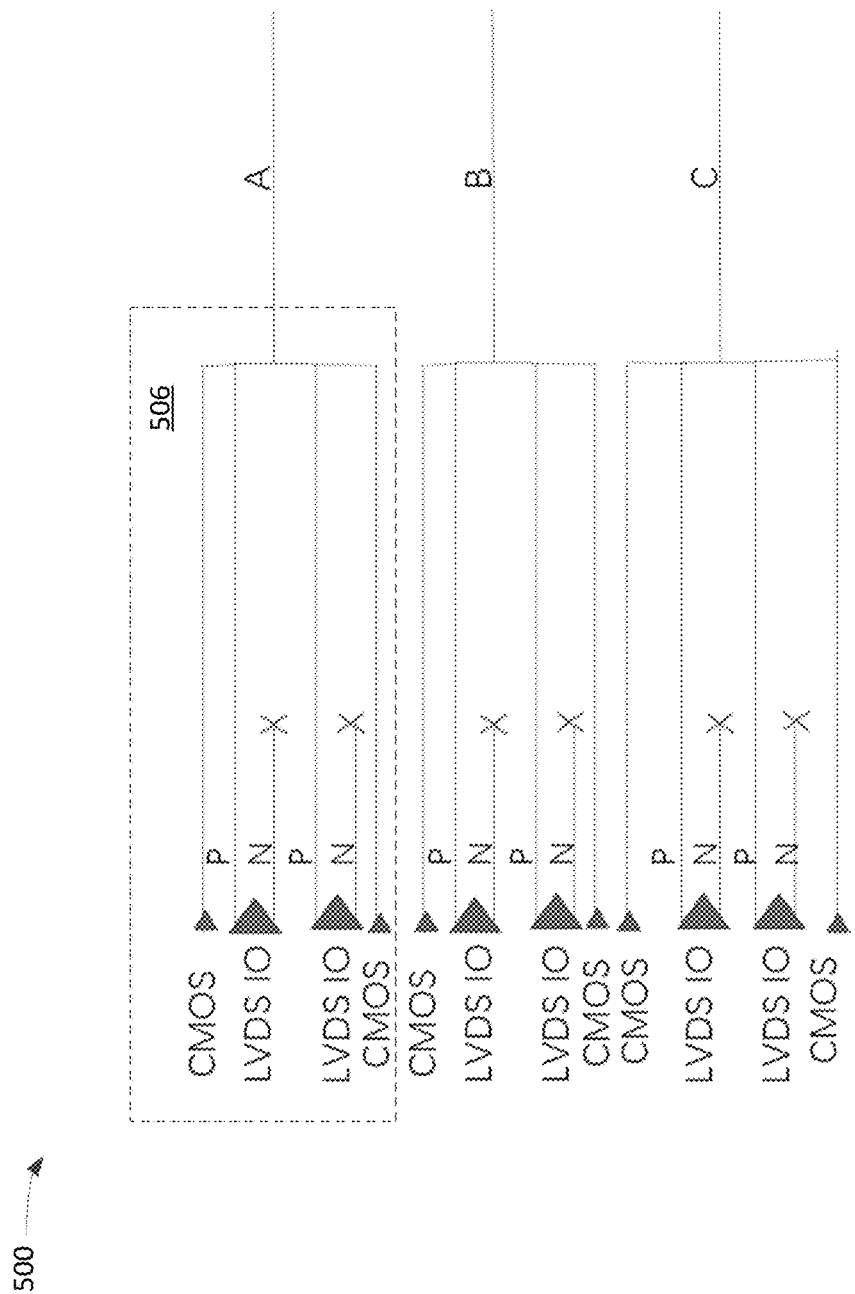
FIGS. 5A-5C are block diagrams illustrating alternative embodiments of IBD using FPGA blocks in accordance with one embodiment of the present invention.

FIG. 5A is a block diagram 500 illustrating one embodiments of IBD using FPGA blocks in accordance with one embodiment of the present invention. Diagram 500 shows a method of using LVDS (low-voltage differential signaling) and CMOS IO to emulate a C-PHY trio. In one aspect, IBD employs two LVDS for each one C-PHY trio wherein values on N channels are discarded as indicated by numeral 506. It should be noted that the underlying concept of the exemplary embodiment(s) of the present invention would not change if one or more blocks (circuit or elements) were added to or removed from FIG. 5A.

Figure 5B:
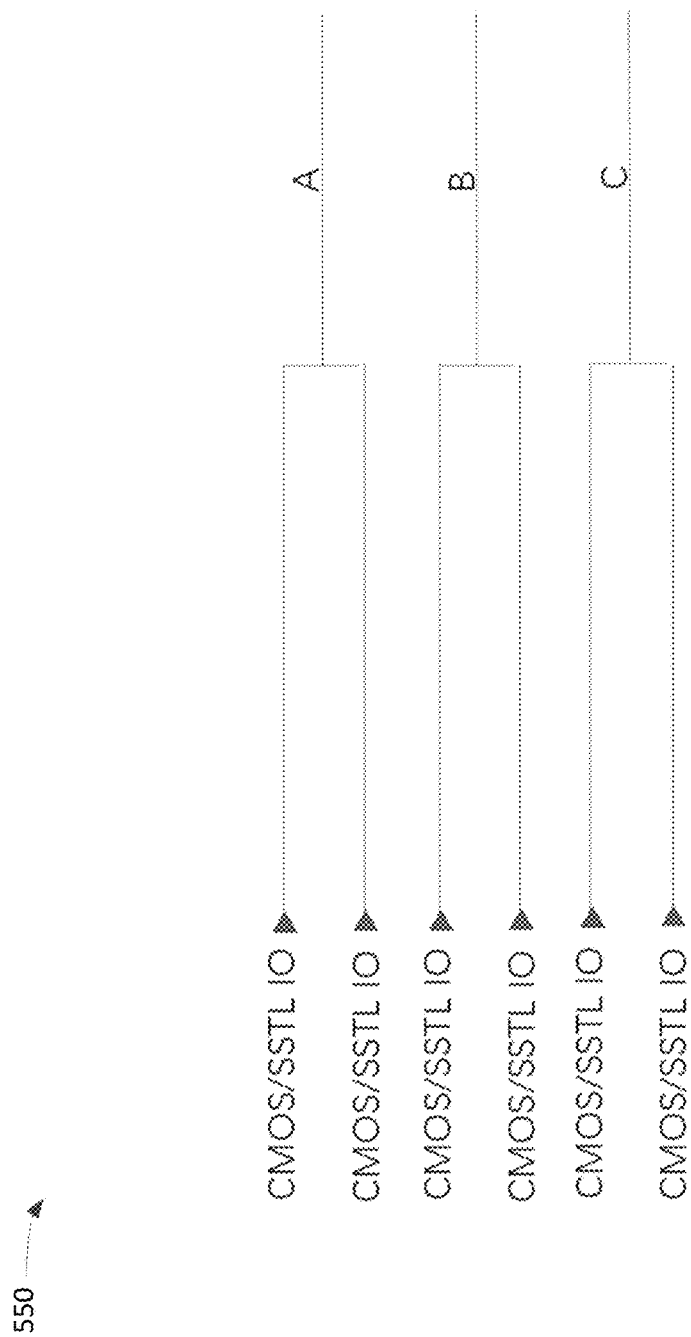

It should be noted that using FPGA serializers with LVDS+CMOS IO to achieve C-PHY interface involving multiple LVDS serializer blocks for each C-PHY trio. Note that LVDS uses 1.2V common mode voltage and ~700 mV differential swing. The voltage swing can be reduced by connecting CMOS IOs and driving output terminals to zero (0) V which creates a resistor divider on the output and reducing voltages. With various internal resistance adjustment, a 250 mV (millivolts) common mode voltage and differential swing can be achieved on certain FPGA devices for highspeed mode. The combined IO can also perform low power 1.2V signaling by setting the LVDS transmitter to high impedance and driving the CMOS IO at 1.2V FIG. 5B is a block diagram 550 illustrating one embodiments of IBD using FPGA serializers SSTL (stub series terminated logic) or CMOS IOs to achieve C-PHY interface in accordance with one embodiment of the present invention. Diagram 550 shows a method of using FPGA serializers SSTL or CMOS IOs to achieve C-PHY interface. IBD uses differential IO for developing a C-PHY interface. An alternative embodiment is to use SSTL or CMOS signaling for number of IO required.

Figure 5C:
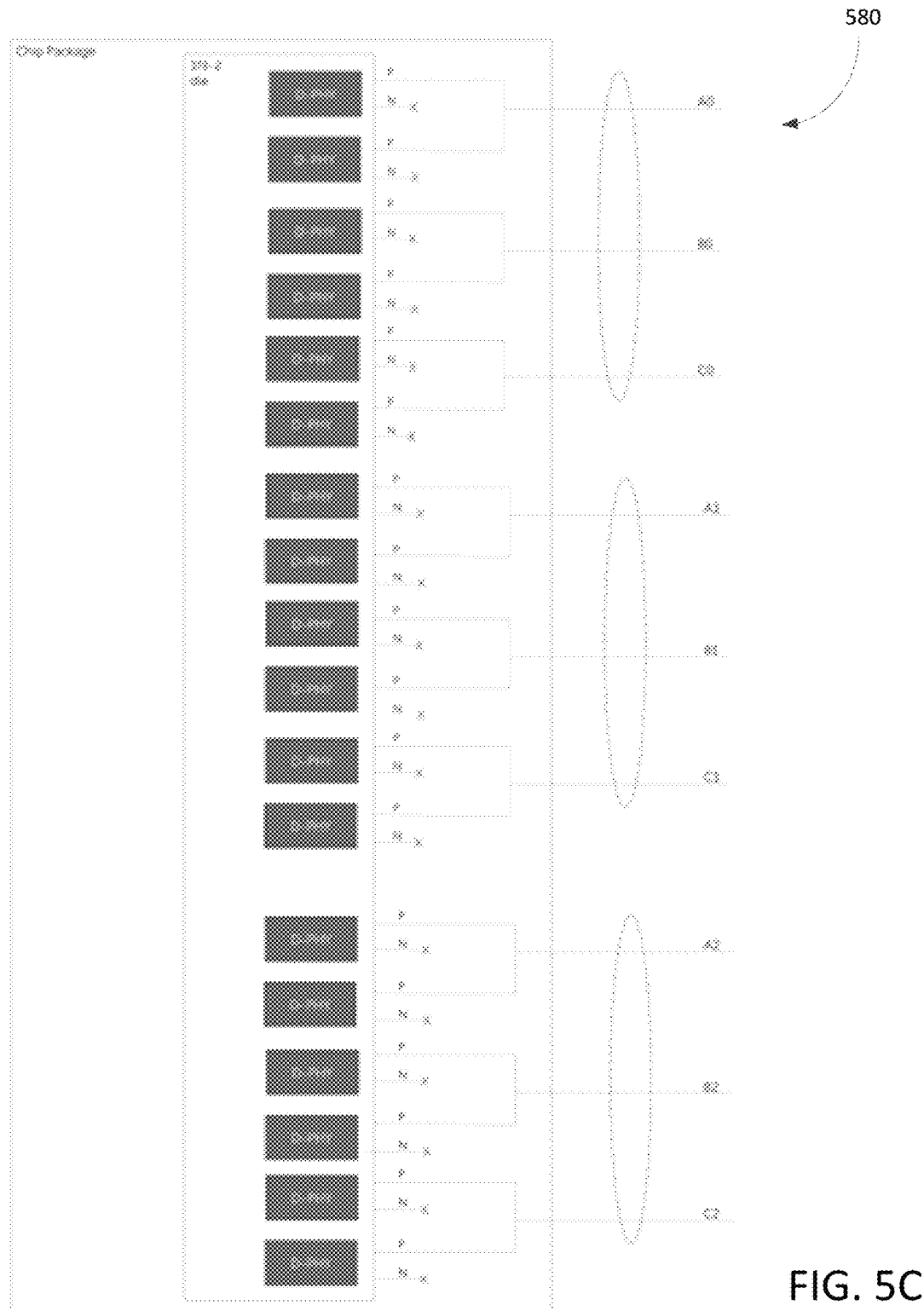

FIG. 5C is a block diagram 580 illustrating an embodiments of IBD using FPGA blocks in accordance with one embodiment of the present invention. In one aspect, diagram 580 illustrates a method or process of emulating C-PHY with IO techniques described in a system in package. When designing a C-PHY TX interface by using P channel of LVDS pairs, the N channel is left as an open circuit, grounded, or connected to other N channels at that package pins on the package pin. The N channel can generally not be used for another purpose. As a result, a package design can be optimized to bring P channel die pad out to the package pin and leaving unused N channels to connect to inside of the package or the substrate. Using P channels for the emulation improves overall number of pins usable for the package which can also optimizing the package size and making the interface act and behave more like a non-emulated C-PHY.

Figure 6A:
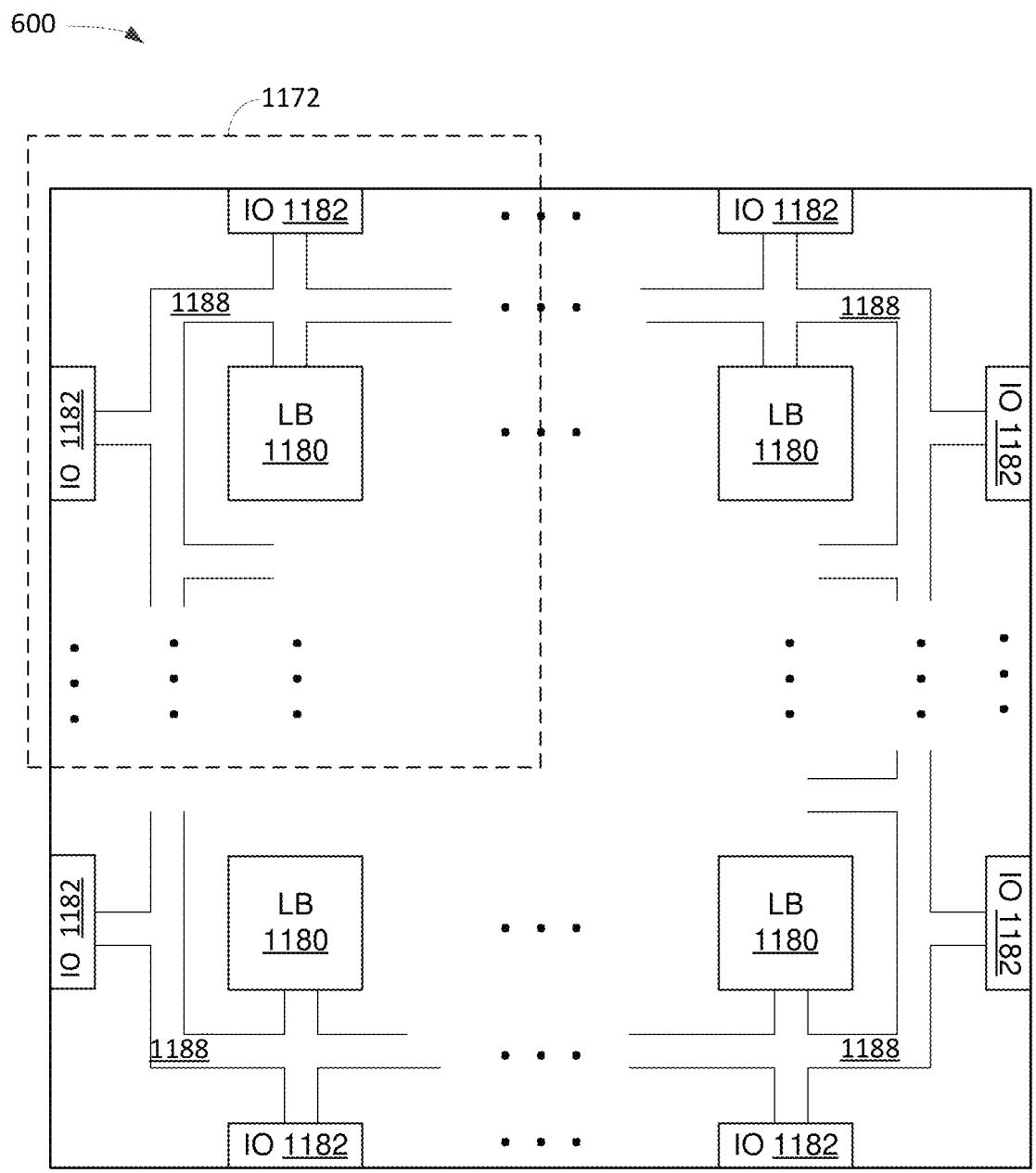
FIGS. 6A-6C are block diagrams illustrating various applications of FPGA or PSD containing IBDs in accordance with one embodiment of the present invention.

FIG. 6A is a block diagram 600 illustrating various applications of FPGA or PSD containing IBDs in accordance with one embodiment of the present invention. PSD, also known as FPGA or a type of Programmable Logic Device ("PLD"), is capable of facilitating SIP operation. It should be noted that the underlying concept of the exemplary embodiment(s) of the present invention would not change if one or more blocks (circuit or elements) were added to or removed from diagram 600.

PSD includes an array of configurable LBs 1180 surrounded by input/output blocks ("IOs") 1182, and programmable interconnect resources 1188 ("PIR") that include vertical interconnections and horizontal interconnections extending between the rows and columns of LB 1180 and IO 1182. PRI 1188 may further include interconnect array decoders ("IAD") or programmable interconnection array ("PIA"). It should be noted that the terms PRI, IAD, and PIA may be used interchangeably hereinafter.

Each LB, in one example, includes programmable combinational circuitry and selectable output registers programmed to implement at least a portion of a user's logic function. The programmable interconnections, connections, or channels of interconnect resources are configured using various switches to generate signal paths between the LBs 1180 for performing logic functions. Each IO 1182 is programmable to selectively use an I/O pin (not shown) of PSD.

PSD, in one embodiment, can be divided into multiple programmable partitioned regions ("PPRs") 1172 wherein each PPR 1172 includes a portion of LBs 1180, some PPRs 1188, and IOs 1182. A benefit of organizing PSD into multiple PPRs 1172 is to optimize management of storage capacity, power supply, and/or network transmission.

Bitstream is a binary sequence (or a file) containing programming information or configuration information for an FPGA or PLD. The bitstream is created to reflect user's logic functions together with certain controlling information. For an FPGA or PLD to function properly, at least a portion of the registers or flipflops in the FPGA needs to be programmed or configured before it can function.

Figure 6B:
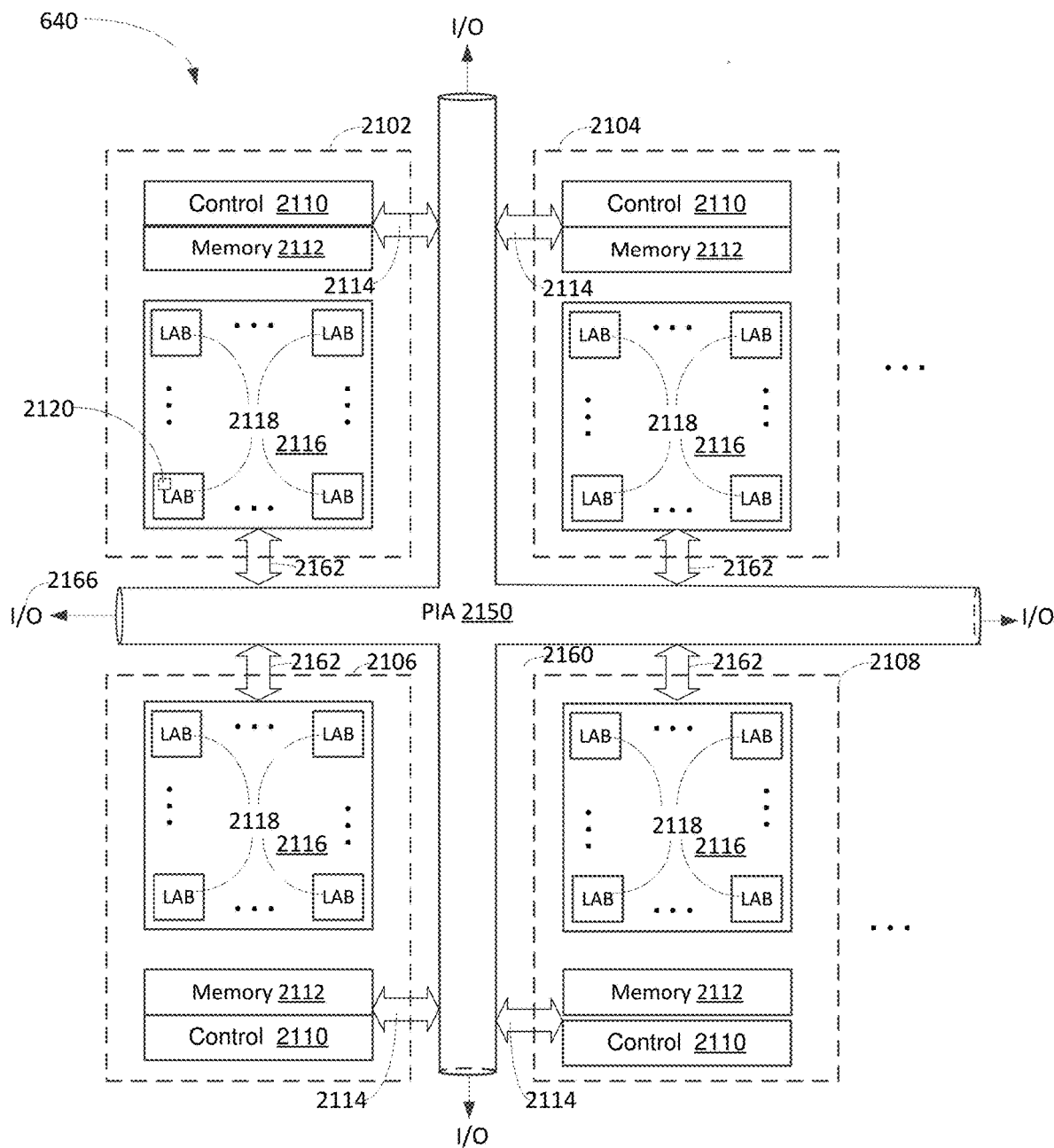

FIG. 6B is a block diagram 600 illustrating various applications of FPGA or PSD containing IBDs in accordance with one embodiment of the present invention. To simplify forgoing discussion, the terms "PSD", "PIC", FPGA, and PLD are referring the same or similar devices and they can be used interchangeably hereinafter. Diagram 640 includes multiple PPRs 2102-2108, PIA 2150, and regional I/O ports 2166. PPRs 2102-2108 further includes control units 2110, memory 2112 and LB s 2116. Note that control units 2110 can be configured into one single control unit, and similarly, memory 2112 can also be configured into one single memory for storing configurations. It should be noted that the underlying concept of the exemplary embodiment(s) of the present invention would not change if one or more blocks (circuit or elements) were added to or removed from diagram 640.

LB s 2116, also known as configurable function unit ("CFU") include multiple LABs 2118 which is also known as configurable logic unit ("CLU"). Each LAB 2116, for example, can be further organized to include, among other circuits, a set of programmable logical elements ("LEs"), configurable logic slices ("CLS"), or macrocells, not shown in FIG. 6B. Each LAB, in one example, may include anywhere from 32 to 512 programmable LEs. I/O pins (not shown in FIG. 6B), LABs, and LEs are linked by PIA 2150 and/or other buses, such as buses 2162 or 2114, for facilitating communication between PIA 2150 and PPRs 2102-2108.

Each LE includes programmable circuits such as the product-term matrix, lookup tables, and/or registers. LE is also known as a cell, configurable logic block ("CLB"), slice, CFU, macrocell, and the like. Each LE can be independently configured to perform sequential and/or combinatorial logic operation(s). It should be noted that the underlying concept of PSD would not change if one or more blocks and/or circuits were added or removed from PSD.

Control units 2110, also known as configuration logics, can be a single control unit. Control unit 2110, for instance, manages and/or configures individual LE in LAB 2118 based on the configuring information stored in memory 2112. It should be noted that some I/O ports or I/O pins are configurable so that they can be configured as input pins and/or output pins. Some I/O pins are programmed as bi-directional I/O pins while other I/O pins are programmed as unidirectional I/O pins. The control units such as unit 2110 is used to handle and/or manage PSD operations in accordance with system clock signals.

LBs 2116 include multiple LAB s which can be programed by the end user(s). Each LAB contains multiple LEs wherein each LE further includes one or more lookup tables ("LUTs") as well as one or more registers (or D flip-flops or latches). Depending on the applications, LEs can be configured to perform user specific functions based on a predefined functional library facilitated by configuration software. PSD, in some applications, also includes a set fixed circuits for performing specific functions. For example, the fixed circuits include, but not limited to, processor(s), DSP (digital signal processing) unit(s), wireless transceiver(s), and so forth.

PIA 2150 is coupled to LBs 2116 via various internal buses such as buses 2114 or 2162. In some embodiments, buses 2114 or 2162 are part of PIA 2150. Each bus includes channels or wires for transmitting signals. It should be noted that the terms channel, routing channel, wire, bus, connection, and interconnection are referred to the same or similar connections and will be used interchangeably herein. PIA 2150 can also be used to receives and/or transmits data directly or indirectly from/to other devices via I/O pins and LAB s.

Memory 2112 may include multiple storage units situated across a PPR. Alternatively, memories 2112 can be combined into one single memory unit in PSD. In one embodiment, memory 2112 is an NVM storage unit used for both configuration as well as user memory. NVM storage unit can be, but not limited to, MRAM, flash, Ferroelectric RAM, and/or phase changing memory (or chalcogenide RAM). To simplify forgoing discussion, MRAM is used as an exemplary NVM throughout the remaining of the discussion. Depending on the applications, a portion of the memory 2112 can be designated, allocated, or configured to be a block RAM ("BRAM") used for storing large amounts of data in PSD.

A PSD includes a number of programmable LB s 2116 that are interconnected by PIA 2150, wherein each programmable LB is further divided into multiple LAB s 2118. Each LAB 2118 further includes a number of LUTs, multiplexers and/or registers. During configuration, a user programs a truth table for each LUT to implement a desired logical function. It should be noted that each LAB, which can be further organized to include multiple logic elements ("LEs"), can be considered as a configurable logic cell ("CLC") or slice. For example, a four-input (16 bit) LUT receives LUT inputs from a routing structure (not shown in FIG. 6B). Based upon the truth table programmed into LUT during configuration of PSD, a combinatorial output is generated via a programmed truth table of LUT in accordance with the logic values of LUT inputs. The combinatorial output is subsequently latched or buffered in a register or flip-flop before the clock cycle ends.

In one aspect, FPGA such as PPR 2102 includes IBD 2120 which can be hard or soft component for providing data conversion between D-PHY and C-PHY.

Figure 6C:
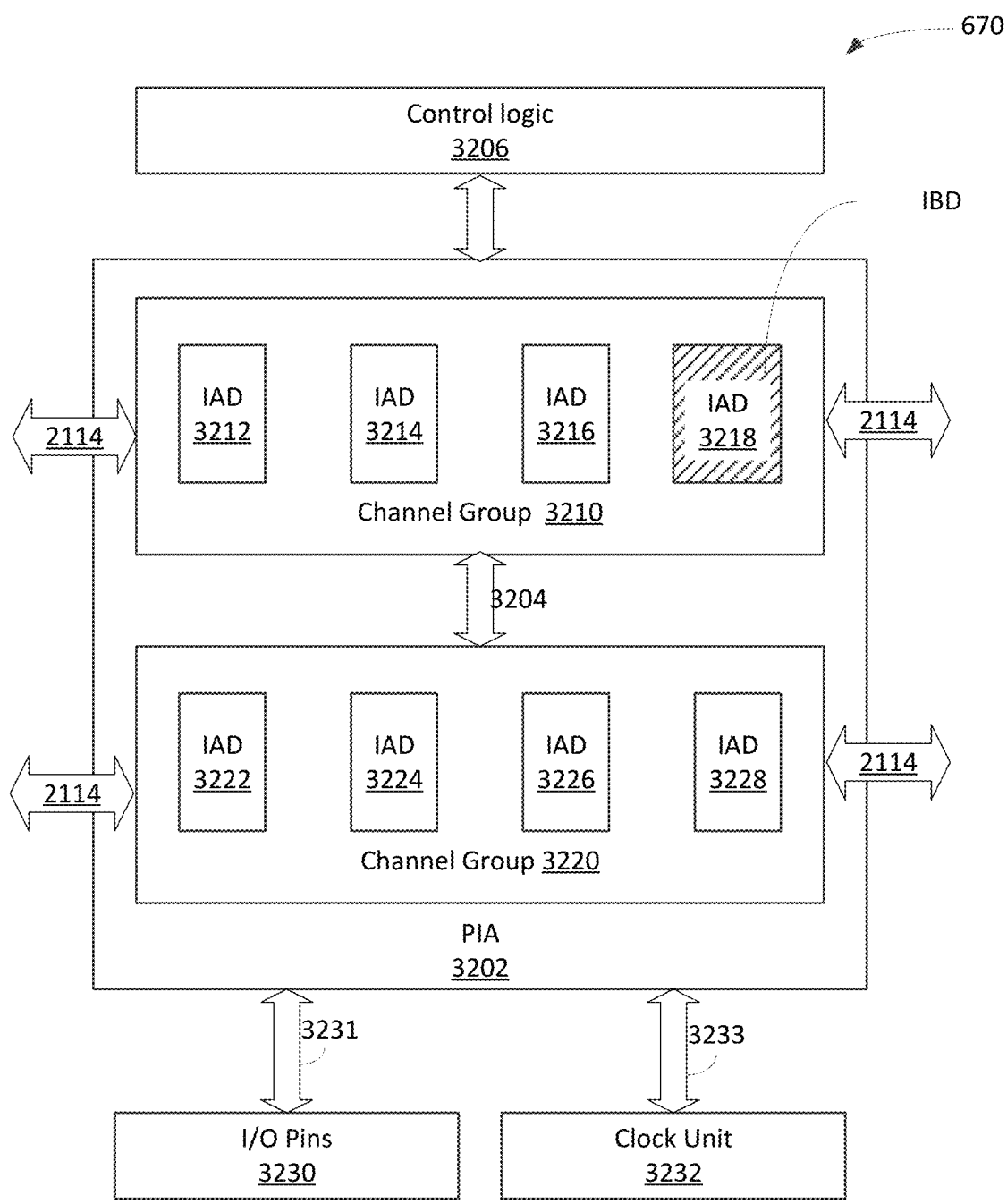

FIG. 6C is a block diagram 670 illustrating a routing logic or routing fabric capable of facilitating SIP operation in accordance with one embodiment of the present invention. Diagram 670 includes control logic 3206, PIA 3202, I/O pins 3230, and clock unit 3232. Control logic 3206, which may be similar to control units shown in FIG. 6B, provides various control functions including channel assignment, differential I/O standards, and clock management. Control logic 3206 may contain volatile memory, non-volatile memory, and/or a combination of volatile and nonvolatile memory device for storing information such as configuration data. In one embodiment, control logic 3206 is incorporated into PIA 3202. It should be noted that the underlying concept of the exemplary embodiment(s) of the present invention would not change if one or more blocks (circuit or elements) were added to or removed from diagram 670.

I/O pins 3230, connected to PIA 3202 via a bus 3231, contain multiple programmable I/O pins configured to receive and/or transmit signals to external devices. Each programmable I/O pin, for instance, can be configured to input, output, and/or bi-directional pin. Depending on the applications, I/O pins 3230 may be incorporated into control logic 3206.

Clock unit 3232, in one example, connected to PIA 3202 via a bus 3233, receives various clock signals from other components, such as a clock tree circuit or a global clock oscillator. Clock unit 3232, in one instance, generates clock signals in response to system clocks as well as reference clocks for implementing I/O communications. Depending on the applications, clock unit 3232, for example, provides clock signals to PIA 3202 including reference clock(s).

PIA 3202, in one aspect, is organized into an array scheme including channel groups 3210 and 3220, bus 3204, and I/O buses 2114. Channel groups 3210, 3220 are used to facilitate routing information between LB s based on PIA configurations. Channel groups can also communicate with each other via internal buses or connections such as bus 3204. Channel group 3210 further includes interconnect array decoders ("IADs") 3212-3218. Channel group 3220 includes four IADs 3222-3228. A function of IAD is to provide a configurable routing resources for data transmission.

IAD such as IAD 3212 includes routing multiplexers or selectors for routing signals between I/O pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 3202, in one embodiment, designates a special IAD such as IAD 3218 for facilitating bridging routing. For example, IAD 3218 is designated to handle connections and/or routings for facilitating TBD functions.

Figure 7:
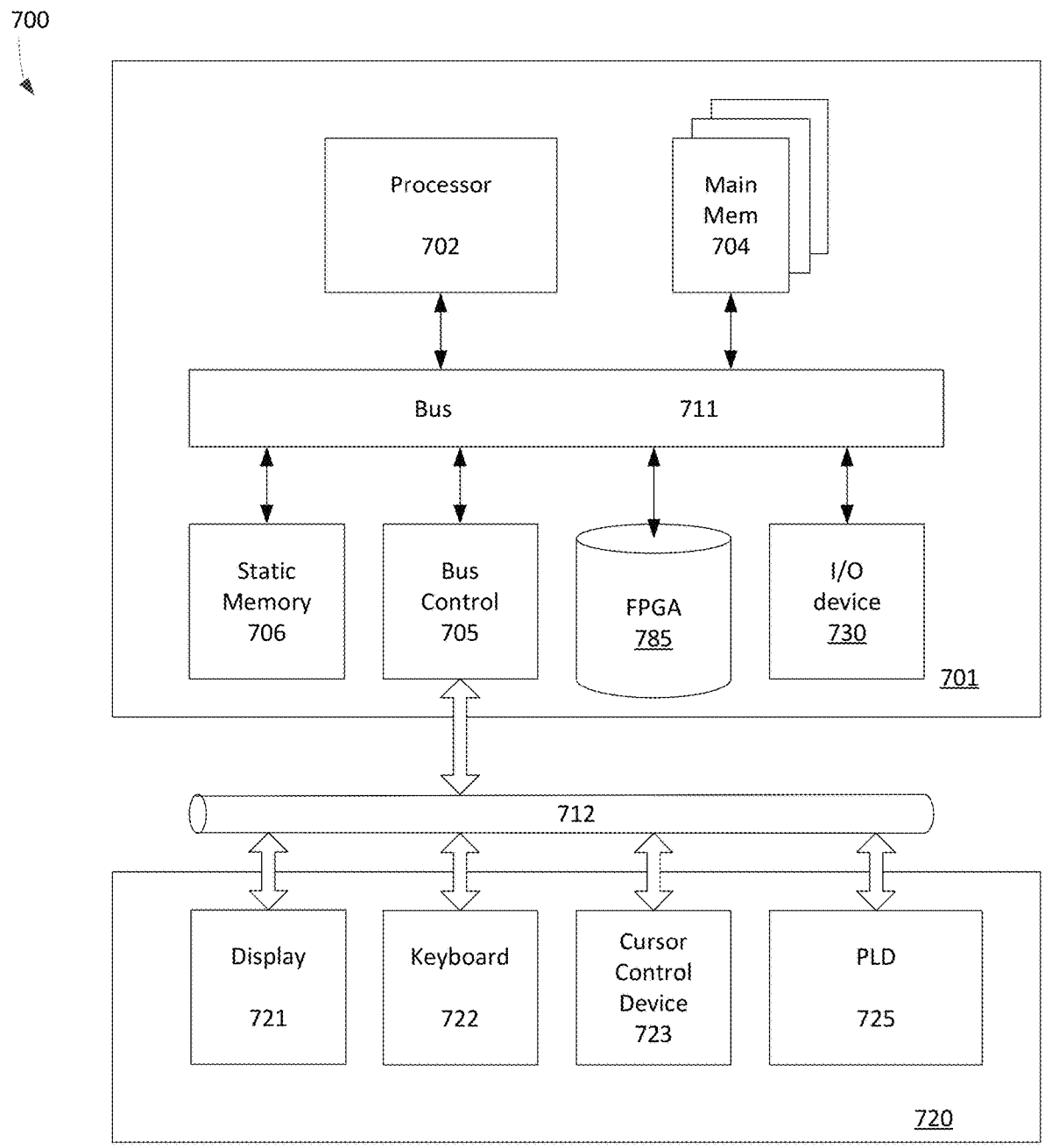
FIG. 7 is a diagram illustrating a system or computer using PSD with IBD for providing bridging functions in accordance with one embodiment of the present invention.

FIG. 7 is a diagram 700 illustrating a system or computer using PSD with TBD for providing bridging functions in accordance with one embodiment of the present invention. Computer system 700 includes a processing unit 701, an interface bus 712, and an input/output ("IO") unit 720. Processing unit 701 includes a processor 702, main memory 704, system bus 711, static memory device 706, bus control unit 705, I/O element 730, and FPGA 785. It should be noted that the underlying concept of the exemplary embodiment(s) of the present invention would not change if one or more blocks (circuit or elements) were added to or removed from FIG. 7.

Bus 711 is used to transmit information between various components and processor 702 for data processing. Processor 702 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 704, which may include multiple levels of cache memories, stores frequently used data and instructions. Main memory 704 may be RAM (random access memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Bus control unit 705 manages the communications between bus 711 and bus 712. Mass storage memory or SSD which may be a magnetic disk, an optical disk, hard disk drive, floppy disk, CD-ROM, and/or flash memories are used for storing large amounts of data.

I/O unit 720, in one embodiment, includes a display 721, keyboard 722, cursor control device 723, and low-power PLD 725. Display device 721 may be a liquid crystal device, cathode ray tube ("CRT"), touch-screen display, or other suitable display device. Display 721 projects or displays images of a graphical planning board. Keyboard 722 may be a conventional alphanumeric input device for communicating information between computer system 700 and computer operator(s). Another type of user input device is cursor control device 723, such as a conventional mouse, touch mouse, trackball, or other type of cursor for communicating information between system 700 and user(s).

PLD 725 is coupled to bus 712 for providing configurable logic functions to local as well as remote computers or servers through wide-area network. PLD 725 and/or FPGA 785 is capable of facilitating SIP operation to enhance overall device performance. In one example, PLD 725 may be used in a modem or a network interface device for facilitating communication between computer 700 and the network. Computer system 700 may be coupled to a number of servers via a network infrastructure as illustrated in the following discussion.

Figure 8:
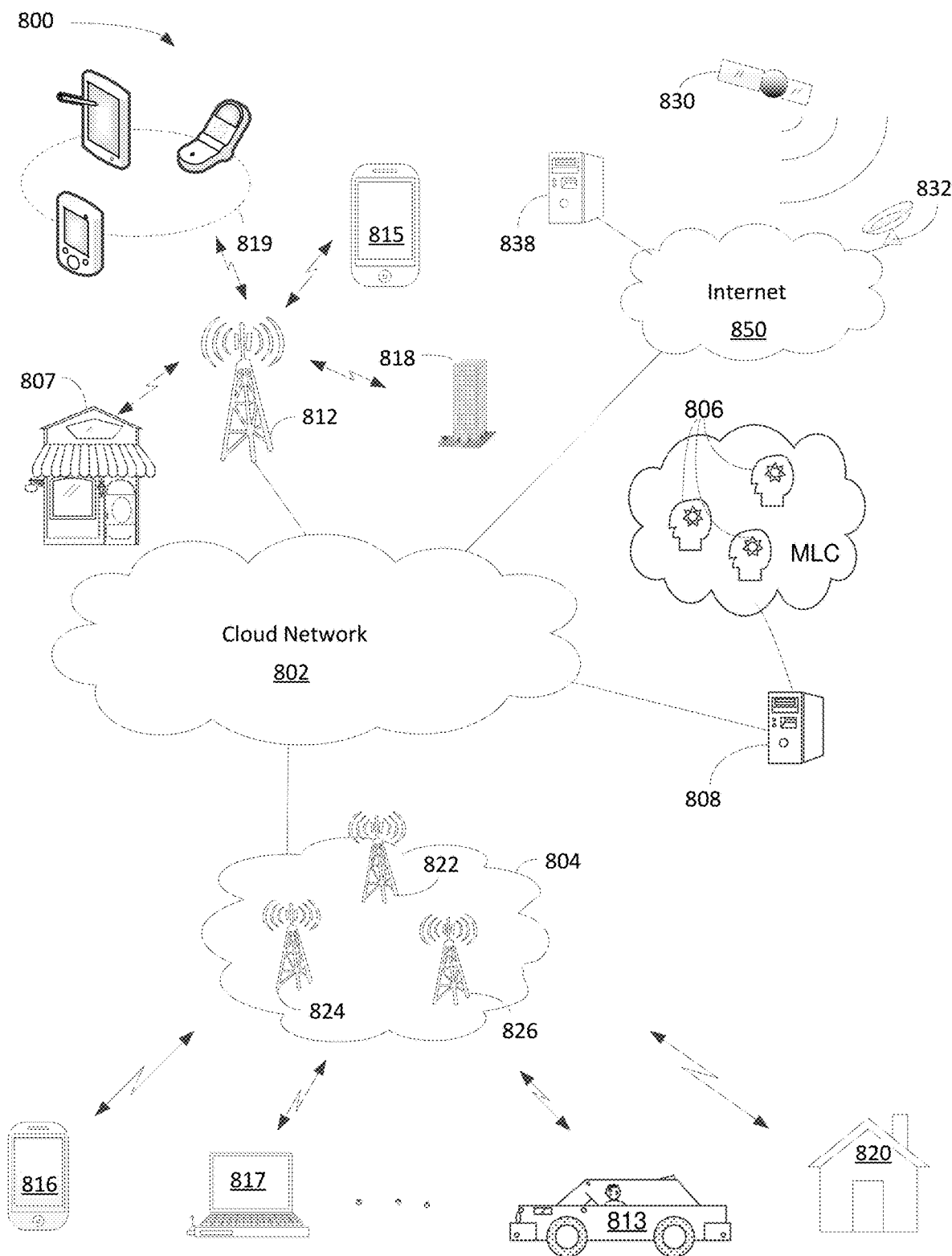
FIG. 8 is a block diagram illustrating various applications of PSD (e.g., FPGA, PLD, etc.) capable of facilitating user-defined logic functions including IBD functions in accordance with one embodiment of the present invention.

FIG. 8 is a block diagram 800 illustrating various applications of PSD (e.g., FPGA, PLD, etc.) capable of facilitating user-defined logic functions including IBD functions in accordance with one embodiment of the present invention. Diagram 800 illustrates AI server 808, communication network 802, switching network 804, Internet 850, and portable electric devices 813-819. In one aspect, PSD capable of facilitating SIP operation is used in AI server, portable electric devices, and/or switching network. Network or cloud network 802 can be wide area network, metropolitan area network ("MAN"), local area network ("LAN"), satellite/terrestrial network, or a combination of wide area network, MAN, and LAN. It should be noted that the underlying concept of the exemplary embodiment(s) of the present invention would not change if one or more blocks (or networks) were added to or removed from diagram 800.

Network 802 includes multiple network nodes, not shown in FIG. 8, wherein each node may include mobility management entity ("MME"), radio network controller ("RNC"), serving gateway ("S-GW"), packet data network gateway ("P-GW"), or Home Agent to provide various network functions. Network 802 is coupled to Internet 850, AI server 808, base station 812, and switching network 804. Server 808, in one embodiment, includes machine learning computers ("MLC") 806.

Switching network 804, which can be referred to as packet core network, includes cell sites 822-826 capable of providing radio access communication, such as 3G ($3^{rd}$ generation), 4G, or 5G cellular networks. Switching network 804, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 804 is logically coupling multiple users and/or mobiles 816-820 across a geographic area via cellular and/or wireless networks. It should be noted that the geographic area may refer to a campus, city, metropolitan area, country, continent, or the like.

Base station 812, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 815, laptop computer 817, iPhone® 816, tablets and/or iPad® 819 via wireless communications. Handheld device can also be a smartphone, such as iPhone®, BlackBerry®, Android®, and so on. Base station 812, in one example, facilitates network communication between mobile devices such as portable handheld device 813-819 via wired and wireless communications networks. It should be noted that base station 812 may include additional radio towers as well as other land switching circuitry.

Internet 850 is a computing network using Transmission Control Protocol/Internet Protocol ("TCP/IP") to provide linkage between geographically separated devices for communication. Internet 850, in one example, couples to supplier server 838 and satellite network 830 via satellite receiver 832. Satellite network 830, in one example, can provide many functions as wireless communication as well as global positioning system ("GPS").

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 9:
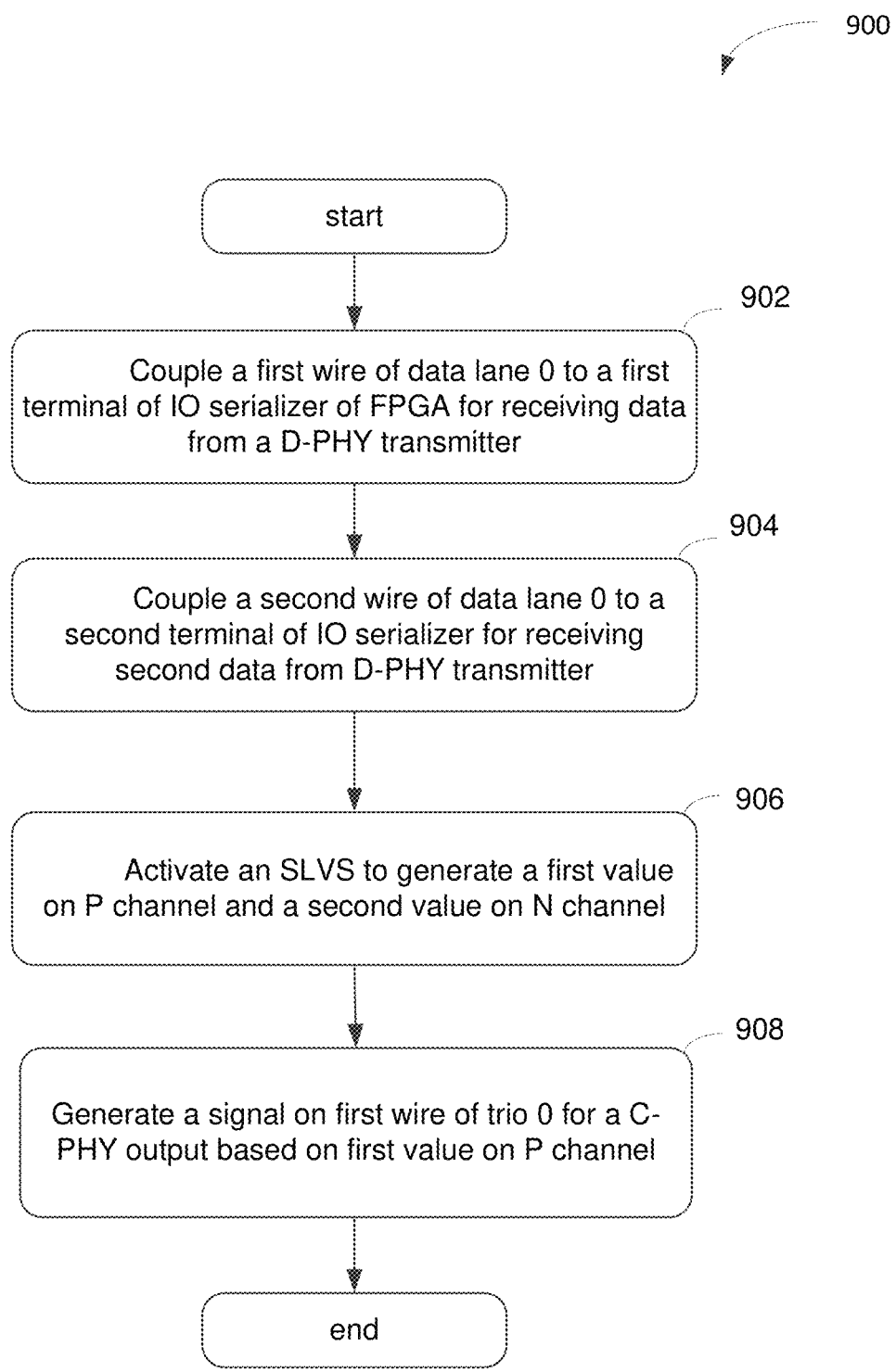
FIG. 9 is a flowchart illustrating a process of achieving bridging functions using FPGA hard or soft blocks in accordance with one embodiment of the present invention.

FIG. 9 is a flowchart 900 illustrating a process of achieving bridging functions using FPGA hard or soft blocks in accordance with one embodiment of the present invention. At block 902, a process for providing a C-PHY IO interface via FPGA is able to couple a first wire of data lane 0 to a first terminal of first IO serializer of FPGA for receiving first data from a D-PHY transmitter of a first device.

At block 904, a second wire of the data lane 0 is coupled to a second terminal of the first IO serializer of FPGA for receiving second data from the D-PHY transmitter.

At block 906, a first scalable low-voltage signal ("SLVS") is activated to generate a first value on P channel and a second value on N channel in response to the first data and the second data.

At block 908, the process is capable of generating a first signal on first wire of trio 0 for a C-PHY output based on the first value on the P channel. In one embodiment, the process is also capable of discarding the second value on the N channel as well as discarding clock signals from a clock lane from the D-PHY transmitter.

In one embodiment, the process is further capable of coupling a first wire of data lane 1 to a first terminal of second IO serializer of the FPGA for receiving first data of lane 1 from the D-PHY transmitter and coupling a second wire of the data lane 1 to a second terminal of the second IO serializer of the FPGA for receiving second data of lane 1 from the D-PHY transmitter. Upon activating a second SLVS to generate a first value on P channel of the second SLVS and a second value on N channel of the second SLVS in response to the first data of lane 1 and the second data of lane 1, a second signal on second wire of trio 0 is generated for the C-PHY output based on the first value on the P channel of the second SLVS. In one aspect, the second value on the N channel of the second SLVS is discarded.

In another embodiment, the process is also capable of coupling a first wire of data lane 2 to a first terminal of third IO serializer of the FPGA for receiving first data of lane 2 from the D-PHY transmitter and coupling a second wire of the data lane 2 to a second terminal of the third IO serializer of the FPGA for receiving second data of lane 2 from the D-PHY transmitter. After activating a third SLVS to generate a first value on P channel of the third SLVS and a second value on N channel of the third SLVS in response to the first data of lane 2 and the second data of lane 2, a third signal on third wire of trio 0 is generated for the C-PHY output based on the first value on the P channel of the third SLVS.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing a C physical layer ("C-PHY") input output ("IO") interface via a field programmable gate arrays ("FPGA"), comprising:
    coupling a first wire of data lane 0 to a first terminal of first IO serializer of FPGA for receiving first data from a D physical layer ("D-PHY") transmitter of a first device;
    coupling a second wire of the data lane 0 to a second terminal of the first IO serializer of FPGA for receiving second data from the D-PHY transmitter;
    activating a first scalable low-voltage signal ("SLVS") to generate a first value on P channel and a second value on N channel in response to the first data and the second data; and
    generating a first signal on first wire of trio 0 for a C-PHY output based on the first value on the P channel.

2. The method of claim 1, further comprising discarding the second value on the N channel.

3. The method of claim 1, further comprising discarding clock signals from a clock lane from the D-PHY transmitter.

4. The method of claim 1, further comprising:
    coupling a first wire of data lane 1 to a first terminal of second IO serializer of the FPGA for receiving first data of lane 1 from the D-PHY transmitter; and
    coupling a second wire of the data lane 1 to a second terminal of the second IO serializer of the FPGA for receiving second data of lane 1 from the D-PHY transmitter.

5. The method of claim 4, further comprising activating a second SLVS to generate a first value on P channel of the second SLVS and a second value on N channel of the second SLVS in response to the first data of lane 1 and the second data of lane 1.

6. The method of claim 5, further comprising generating a second signal on second wire of trio 0 for the C-PHY output based on the first value on the P channel of the second SLVS.

7. The method of claim 4, further comprising discarding the second value on the N channel of the second SLVS.

8. The method of claim 1, further comprising:
    coupling a first wire of data lane 2 to a first terminal of third IO serializer of the FPGA for receiving first data of lane 2 from the D-PHY transmitter; and
    coupling a second wire of the data lane 2 to a second terminal of the third IO serializer of the FPGA for receiving second data of lane 2 from the D-PHY transmitter.

9. The method of claim 8, further comprising activating a third SLVS to generate a first value on P channel of the third SLVS and a second value on N channel of the third SLVS in response to the first data of lane 2 and the second data of lane 2.

10. The method of claim 9, further comprising generating a third signal on third wire of trio 0 for the C-PHY output based on the first value on the P channel of the third SLVS.

11. The method of claim 10, further comprising discarding the second value on the N channel of the third SLVS.

12. A method for providing a C physical layer ("C-PHY") input output ("IO") interface via a field programmable gate arrays ("FPGA"), comprising:
    coupling a first wire of data lane 0 to a first terminal of first IO serializer of FPGA for receiving first data from a D physical layer ("D-PHY") transmitter of a first device;
    coupling a second wire of the data lane 0 to a second terminal of the first IO serializer of FPGA for receiving second data from the D-PHY transmitter;
    activating a first low-voltage differential signaling ("LVDS") to generate a first value on P channel of the first LVDS and a second value on N channel of the LVDS in response to the first data and the second data; and
    generating a first signal on first wire of trio 0 for a C-PHY output based on the first value on the P channel of the first LVDS.

13. The method of claim 12, further comprising discarding the second value on the N channel of the first LVDS.

14. The method of claim 12, further comprising discarding clock signals from a clock lane from the D-PHY transmitter.

15. The method of claim 12, further comprising:
    coupling a first wire of data lane 1 to a first terminal of second IO serializer of the FPGA for receiving first data of lane 1 from the D-PHY transmitter; and
    coupling a second wire of the data lane 1 to a second terminal of the second IO serializer of the FPGA for receiving second data of lane 1 from the D-PHY transmitter.

16. The method of claim 15, further comprising activating a second LVDS to generate a first value on P channel of the second LVDS and a second value on N channel of the second LVDS in response to the first data of lane 1 and the second data of lane 1.

17. The method of claim 16, further comprising generating a second signal on second wire of trio 0 for the C-PHY output based on the first value on the P channel of the second LVDS.

18. The method of claim 12, further comprising discarding the second value on the N channel of the second LVDS.

19. An interface bridging device for converting data formatted in D physical layer ("D-PHY") to data formatted in C physical layer ("C-PHY"), comprising;
    a D-PHY receiving block, operated by a first programmed portion of programmable logic elements ("LEs") of field programmable gate arrays ("FPGA"), configured to receive incoming data from a plurality of lanes based on D-PHY protocol;
    a display serial interface ("DSI") D-PHY decoder, operated by a second programmed portion of programmable LEs of FPGA, coupled to the D-PHY receiving block and configured to generate decoded data in accordance with the incoming data;
    a storage block coupled to the DSI D-PHY decoder and configured to temporarily buffer the decoded data; and
    a DSI C-PHY encoder coupled to the storage block and configured to generating values in C-PHY protocol by encoding the decoded data.

20. The device of claim 19, further comprising a C-PHY transmitter coupled to the DSI C-PHY encoder and able to transmit values via trio bus configurations.

21. The device of claim 19, further comprising a low-power conversion block configured to facilitate power and timing conversions between the D-PHY receiving block and the C-PHY transmitter.

22. The device of claim 19, further comprising a Display Stream Compression ("DSC") block coupled to the DSI D-PHY decoder and configured to compress the decoded data before storing at the storage block.

23. An apparatus comprising an interface bridging device of claim 19 developed as an ASIC or FPGA capable of converting one or more C-PHY interfaces to one or more D-PHY interfaces.

\* \* \* \* \*